(12) United States Patent
Yin et al.

(10) Patent No.: US 10,165,564 B2
(45) Date of Patent: Dec. 25, 2018

(54) SYSTEMS AND METHODS FOR ASSOCIATION TIMING

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 65 days.

(21) Appl. No.: 15/417,080

(22) Filed: Jan. 26, 2017

(65) Prior Publication Data

US 2017/0223702 A1 Aug. 3, 2017

Related U.S. Application Data

(60) Provisional application No. 62/288,150, filed on Jan. 28, 2016.

(51) Int. Cl.
*H04W 72/04* (2009.01)
*H04L 1/18* (2006.01)
*H04L 5/14* (2006.01)
*H04W 72/12* (2009.01)

(52) U.S. Cl.
CPC ....... *H04W 72/0446* (2013.01); *H04L 1/1812* (2013.01); *H04L 1/1854* (2013.01); *H04L 1/1887* (2013.01); *H04L 5/14* (2013.01); *H04W 72/1263* (2013.01)

(58) Field of Classification Search
CPC ....... H04L 5/14; H04L 1/1854; H04L 1/1887; H04L 72/0446; H04L 72/1263
See application file for complete search history.

(56) References Cited

U.S. PATENT DOCUMENTS 9,001,709 B2 4/2015 Zeng et al.
2014/0369242 A1* 12/2014 Ng .................... H04W 72/0453
                                                        370/280
2015/0016431 A1 1/2015 Ranta-Aho et al.
(Continued)

FOREIGN PATENT DOCUMENTS

WO 2007025160 A2 3/2007

OTHER PUBLICATIONS

International Search Report and Written Opinion issued for PCT Application No. US2017/015253 dated May 16, 2017.
(Continued)

*Primary Examiner* — Gary Mui
(74) *Attorney, Agent, or Firm* — Austin Rapp

(57) ABSTRACT

A user equipment (UE) is described. The UE includes a processor and memory in electronic communication with the processor. Instructions stored in the memory are executable to configure a slot-long shortened transmission time interval (S-TTI) in a serving cell, the slot-long S-TTI being used for physical downlink shared channel (PDSCH) reception in the serving cell. The instructions are also executable to determine PDSCH Hybrid Automatic Repeat Request Acknowledgement/Negative Acknowledgement (HARQ-ACK) transmission timing for the serving cell, the PDSCH HARQ-ACK transmission timing being determined based on a downlink (DL) association set pre-defined for the slot-long S-TTI. The instructions are further executable to send PDSCH HARQ-ACK information using the slot-long S-TTI, based on the PDSCH HARQ-ACK transmission timing.

4 Claims, 21 Drawing Sheets

(56) References Cited

U.S. PATENT DOCUMENTS

| | | | |
|---|---|---|---|
| 2015/0263829 A1 | 9/2015 | Nguyen et al. | |
| 2015/0334686 A1 | 11/2015 | Ji et al. | |
| 2015/0334709 A1 | 11/2015 | Ji et al. | |
| 2016/0143030 A1* | 5/2016 | Lee | H04L 5/00 370/329 |
| 2017/0135084 A1* | 5/2017 | Kuchibhotla | H04W 72/044 |
| 2017/0142712 A1* | 5/2017 | Lee | H04W 72/0446 |
| 2017/0290008 A1* | 10/2017 | Tooher | H04W 72/0446 |
| 2017/0332397 A1* | 11/2017 | Li | H04L 1/1861 |
| 2017/0338988 A1* | 11/2017 | Yin | H04L 27/2613 |
| 2018/0020335 A1* | 1/2018 | Yin | H04W 4/06 |
| 2018/0076942 A1* | 3/2018 | Nory | H04L 5/0055 |
| 2018/0077721 A1* | 3/2018 | Nory | H04W 72/14 |

OTHER PUBLICATIONS

Huawei, "Control signaling enhancements for short TTI", 3GPP TSG RAN WG1 Meeting #83, Anaheim, California, US, R1-156461, Nov. 22, 2015.
CMCC, "On TTI shortening for latency reduction", 3GPP TSG RAN WG1 Meeting #83, Anaheim, California, US, R1-157008, Nov. 22, 2015.
CATT, "System Analysis on TTI Shortening", 3GPP TSG RAN WG1 Meeting #83, Anaheim, California, US, R1-156613, Nov. 22, 2015.
Samsung, "Study on specification impact for uplink due to TTI shortening", 3GPP TSG RAN WG1 Meeting #83, Anaheim, California, US, R1-156822, Apr. 22, 2015.
Qualcomm Incorporated, "On physical layer aspects of low latency operation," 3GPP TSG-RAN WG1 Meeting #83, Anaheim, California, US, R1-157082, Nov. 20, 2015.
ETRI, "Discussion on TTI shortening," 3GPP TSG-RAN WG1 Meeting #83, Anaheim, California, US, R1-157110, Nov. 20, 2015.
InterDigital Communications, "Support for Short TTIs and Processing Times in LTE," 3GPP TSG-RAN WG1 Meeting #83, Anaheim, California, US, R1-157136, Nov. 20, 2015.
Nokia Networks, "On required physical layer enhancements for TTI shortening," 3GPP TSG-RAN WG1 Meeting #83, Anaheim, California, US, R1-157294, Nov. 22, 2015.
Huawei, HiSilicon, "Overview of short TTI," 3GPP TSG-RAN WG1 Meeting #83, Anaheim, California, US, R1-156458, Nov. 22, 2015.
Huawei, HiSilicon, "Views on TTI length," 3GPP TSG-RAN WG1 Meeting #83, Anaheim, California, US, R1-156459, Nov. 22, 2015.
Huawei, HiSilicon, "Discussion on DL RS and UL RS for short TTI," 3GPP TSG-RAN WG1 Meeting #83, Anaheim, California, US, R1-156460, Nov. 22, 2015.
Huawei, HiSilicon, "Control signaling enhancements for short TTI," 3GPP TSG-RAN WG1 Meeting #83, Anaheim, California, US, R1-156461, Nov. 22, 2015.
Intel Corporation, "Discussion on TTI Shortening," 3GPP TSG-RAN WG1 Meeting #83, Anaheim, California, US, R1-156540, Nov. 22, 2015.
Alcatel-Lucent Shanghai Bell, Alcatel-Lucent, "Overview of Specification Impact for TTI Shortening," 3GPP TSG-RAN WG1 Meeting #83, Anaheim, California, US, R1-156721, Nov. 22, 2015.
Samsung, "Study on specification impact for downlink due to TTI shortening," 3GPP TSG-RAN WG1 Meeting #83, Anaheim, California, US, R1-156819, Nov. 22, 2015.
Samsung, "Preliminary system-level performance evaluation for TTI shortening," 3GPP TSG-RAN WG1 Meeting #83, Anaheim, California, US, R1-156820, Nov. 22, 2015.
Samsung, "Preliminary link-level performance evaluation for TTI shortening," 3GPP TSG-RAN WG1 Meeting #83, Anaheim, California, US, R1-156821, Nov. 22, 2015.
Samsung, "Study on specification impact for uplink due to TTI shortening," 3GPP TSG-RAN WG1 Meeting #83, Anaheim, California, US, R1-156822, Nov. 22, 2015.
LG Electronics, "Discussion on specification impact for latency reduction techniques," 3GPP TSG-RAN WG1 Meeting #83, Anaheim, California, US, R1-156902, Nov. 20, 2015.
Ericsson, "Overview of TTI shortening," 3GPP TSG-RAN WG1 Meeting #83, Anaheim, California, US, R1-157146, Nov. 22, 2015.
Ericsson, "Physical layer aspects of TTI shortening for downlink transmissions," 3GPP TSG-RAN WG1 Meeting #83, Anaheim, California, US, R1-157148, Nov. 22, 2015.
Ericsson, "Physical layer aspects of short TTI for uplink transmissions," 3GPP TSG-RAN WG1 Meeting #83, Anaheim, California, US, R1-157149, Nov. 22, 2015.
ZTE, "L1 considerations on latency reduction," 3GPP TSG-RAN WG1 Meeting #83, Anaheim, California, US, R1-157151, Nov. 22, 2015.
HTC, "Discussion on control signaling design for reduced TTI," 3GPP TSG-RAN WG1 Meeting #83, Anaheim, California, US, R1-157278, Nov. 22, 2015.
Nokia Networks, "On Shorter TTI for Latency Reduction," 3GPP TSG-RAN WG1 Meeting #83, Anaheim, California, US, R1-157292, Nov. 22, 2015.
Ericsson, Huawei, "New SI proposal: Study on Latency reduction techniques for LTE," 3GPP TSG-RAN WG1 Meeting #67, Shanghai, China, RP-150465, Mar. 12, 2015.
3GPP TS 36.211. v13.0.0, Evolved Universal Terrestrial Radio Access (E-UTRA); Physical channels and modulation (Release 13), Dec. 2015.

* cited by examiner

SYSTEMS AND METHODS FOR ASSOCIATION TIMING

RELATED APPLICATIONS

This application is related to and claims priority from U.S. Provisional Patent Application No. 62/288,150, entitled "SYSTEMS AND METHODS FOR ASSOCIATION TIMING," filed on Jan. 28, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
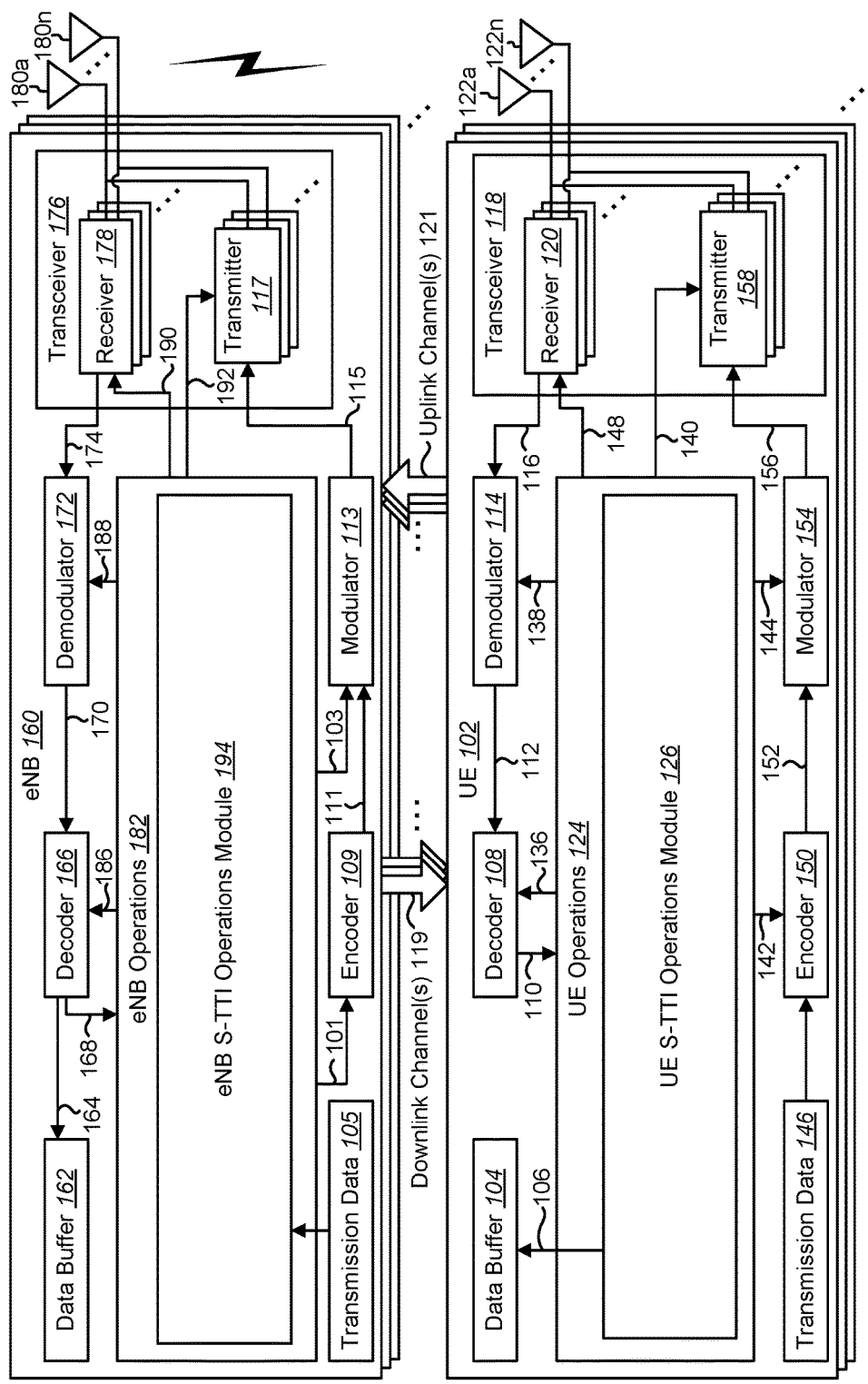
FIG. 1 is a block diagram illustrating one implementation of one or more evolved NodeBs (eNBs) and one or more user equipments (UEs) in which systems and methods for association timing may be implemented.

A user equipment (UE) is described. The UE includes a processor and memory in electronic communication with the processor. Instructions stored in the memory are executable to configure a slot-long shortened transmission time interval (S-TTI) in a serving cell, the slot-long S-TTI being used for physical downlink shared channel (PDSCH) reception in the serving cell. The instructions are also executable to determine PDSCH Hybrid Automatic Repeat Request Acknowledgement/Negative Acknowledgement (HARQ-ACK) transmission timing for the serving cell, the PDSCH HARQ-ACK transmission timing being determined based on a downlink (DL) association set pre-defined for the slot-long S-TTI. The instructions are further executable to send PDSCH HARQ-ACK information using the slot-long S-TTI based on the PDSCH HARQ-ACK transmission timing.

If the serving cell is a time division duplex (TDD) cell, the DL association set may be a DL association set pre-defined for an uplink (UL)/DL configuration which is equal to a DL-reference UL/DL configuration the serving cell. The DL-reference UL/DL configuration of the serving cell may be determined based on a DL-reference configuration of a primary cell and a UL/DL configuration of the serving cell.

If the serving cell is a frequency division duplex (FDD) cell, the DL association set may be a DL association set pre-defined for a UL/DL configuration which is equal to a DL-reference UL/DL configuration of a primary cell.

The DL association set may maintain a timing of a DL association set for a subframe-long TTI.

An evolved node B (eNB) is also described. The eNB includes a processor and memory in electronic communication with the processor. Instructions stored in the memory are executable to configure a slot-long S-TTI in a serving cell, the slot-long S-TTI being used for PDSCH transmission in the serving cell. The instructions are also executable to determine PDSCH HARQ-ACK reception timing for the serving cell, the PDSCH HARQ-ACK reception timing being determined based on a DL association set pre-defined for the slot-long S-TTI. The instructions are further executable to receive PDSCH HARQ-ACK information using the slot-long S-TTI, based on the PDSCH HARQ-ACK reception timing.

A user equipment (UE) is described. The UE includes a processor and memory in electronic communication with the processor. Instructions stored in the memory are executable to determine whether or not S-TTI is configured for a serving cell. The instructions are also executable to receive one or more PDSCH(s). The instructions are further executable to send HARQ-ACK information for the PDSCH(s). In a case that the S-TTI is not configured, the HARQ-ACK information is sent based on a first downlink association set table, the first downlink association set table defining a set of downlink or special subframe(s) associated with each uplink subframe(s) within a radio frame. In a case that the S-TTI is configured, the HARQ-ACK information is sent based on a second downlink association set table, the second downlink association set table defining a set of downlink slot(s) associated with each of uplink slot(s) within the radio frame.

An evolved node B (eNB) is also described. The eNB includes a processor and memory in electronic communication with the processor. Instructions stored in the memory are executable to determine whether or not S-TTI is configured for a serving cell. The instructions are also executable to transmit one or more PDSCH(s). The instructions are further executable to acquire HARQ-ACK information for the PDSCH(s). In a case that the S-TTI is not configured, the HARQ-ACK information is sent based on a first downlink association set table, the first downlink association set table defining a set of downlink or special subframe(s) associated with each uplink subframe(s) within a radio frame. In a case that the S-TTI is configured, the HARQ-ACK information is sent based on a second downlink association set table, the second downlink association set table defining a set of downlink slot(s) associated with each uplink slot(s) within the radio frame.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

In LTE release 12 and earlier, a transmission time interval (TTI) is a subframe with 1 millisecond (ms). For a reduced transmission time interval (R-TTI) for LTE, different TTI sizes are considered for both uplink (UL) and downlink (DL) TTI formats. A reduced TTI can also be referred as short TTI, shortened TTI (S-TTI), etc.

Currently, many different formats are considered for both DL and UL TTI, including 1-symbol TTI, 2-symbol TTI, 3-symbol TTI, 4-symbol TTI and slot size TTI. The actual possible sTTI length may be a subset of the above. For example, only TTI having a slot length may be supported for TDD. The reduced TTI has the potential to reduce the HARQ-ACK feedback of a transmission and the round trip time (RTT).

For DL, to maintain backward compatibility, the physical downlink control channel (PDCCH) region may be reserved as in current specifications. The remaining Orthogonal Frequency Domain Multiplexed (OFDM) symbols can be allocated for subframes with reduced TTI.

For UL, a slot based structure can provide some backward compatibility. This is because most of the reference signals and channel resources may be reused with minor enhancement.

Furthermore, different reduced TTI sizes may be included in a 1 ms subframe. Moreover, the TTI size of DL and UL may be the same, which may simplify the association timing design. Alternatively, the TTI size of DL and UL may be different.

The systems and methods described herein describe the physical downlink shared channel (PDSCH) Hybrid Automatic Repeat Request Acknowledgement/Negative Acknowledgement (HARQ-ACK) association timing with reduced TTI between UL and DL transmissions for TDD networks including time division duplex (TDD) and frequency division duplex (FDD) carrier aggregation (CA).

Specifically, for a TDD serving cell with frame structure type 2, the PDSCH HARQ-ACK timing may be determined by the DL association set corresponding to a given UL subframe. A TDD UL/DL configuration may be used to indicate the allocation of resources that can be used for DL and UL transmissions. It is not possible to transmit UL in a region that is allocated for DL and vice versa. The association timing tends to be larger, especially for a UL/DL configuration with fewer UL allocations.

With reduced TTI sizes, the PDSCH HARQ-ACK feedback may be reported earlier than what is defined by current DL association set. The systems and methods described herein include new DL association sets for each UL/DL configuration, as well as the DL association set for FDD secondary cell (SCell) if the primary cell (PCell) is a TDD cell.

Currently, there are 7 TDD UL/DL configurations. For a TDD UL/DL configuration, a DL associate set is defined for each UL subframe to report PDSCH transmissions.

For FDD-TDD CA with TDD as the PCell, a DL association set is defined for a FDD cell where all subframes can be DL subframes. For TDD CA with different UL/DL configurations, two approaches are defined. One approach is to follow the DL association set of a DL reference configuration based on PCell and SCell UL/DL configurations. Another approach is to use the same FDD DL association set defined for FDD-TDD CA. Furthermore, for an eIMTA TDD cell, the DL association set of a RRC configured DL reference configuration may be used.

With reduced TTI (R-TTI) or shortened TTI (S-TTI), the potential number of PDSCH transmissions is increased, and the potential number of reporting UL TTIs is also increased. The feedback latency may be reduced so that the HARQ-ACK can be reported earlier than what is defined by current DL association timing. Thus, new sets of DL association set may be defined.

Several approaches of DL association sets are described. In a first approach, the current DL association timing in a slot level may be kept. This reuses existing timing, and minimizes specification changes. This may be an easy solution with backward compatibility.

In a second approach, a new association set may be optimized for each TDD UL/DL configuration. The FDD DL association set may be defined as a superset of TDD DL association set. With this approach, the FDD set may not be optimized.

In a third approach, a new association set may be optimized for an FDD cell based on a TDD PCell UL/DL configuration. The same DL association set may be used on all configured TDD primary cells (PCells) and secondary cells (Scells). This approach may not be optimized for TDD configurations.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for association timing may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include one or more of a UE S-TTI operations module 126.

Figure 5:
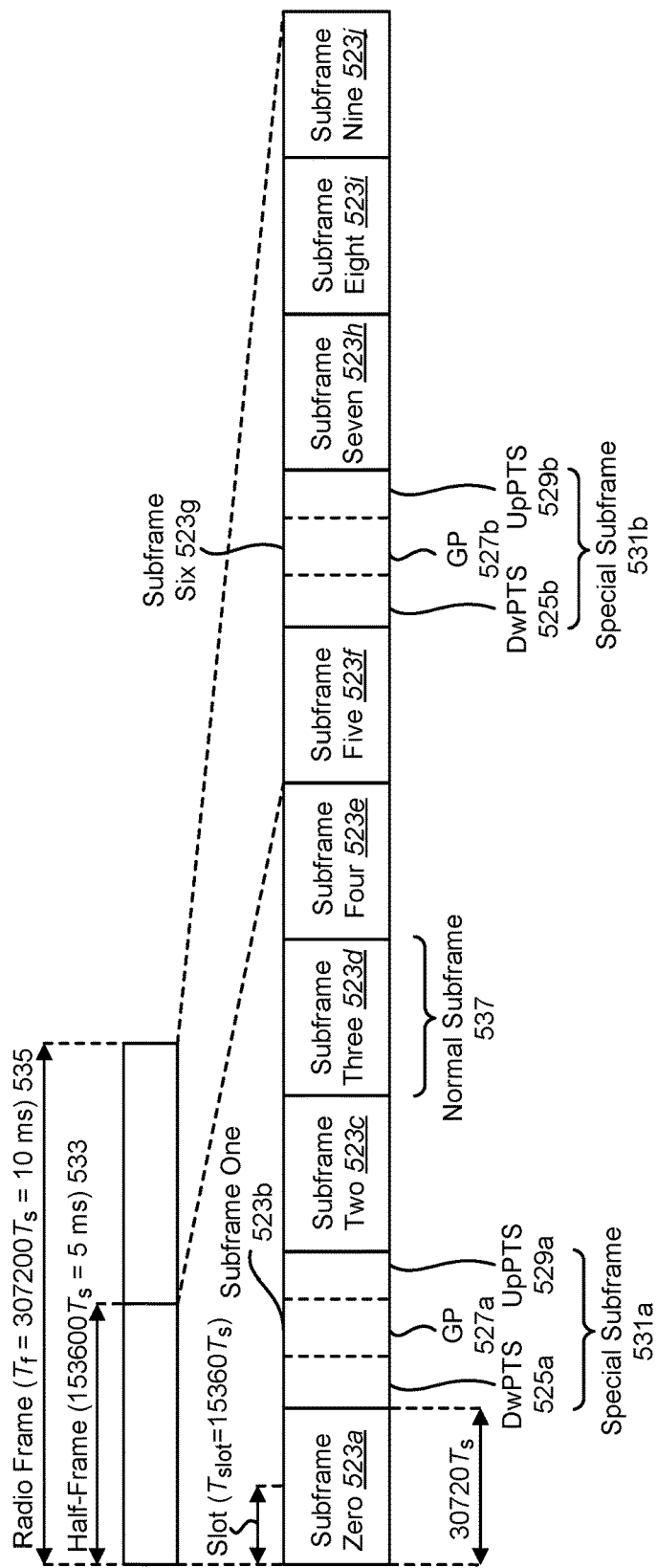
FIG. 5 is a diagram illustrating one example of a radio frame that may be used in accordance with the systems and methods disclosed herein.
Figure 6:
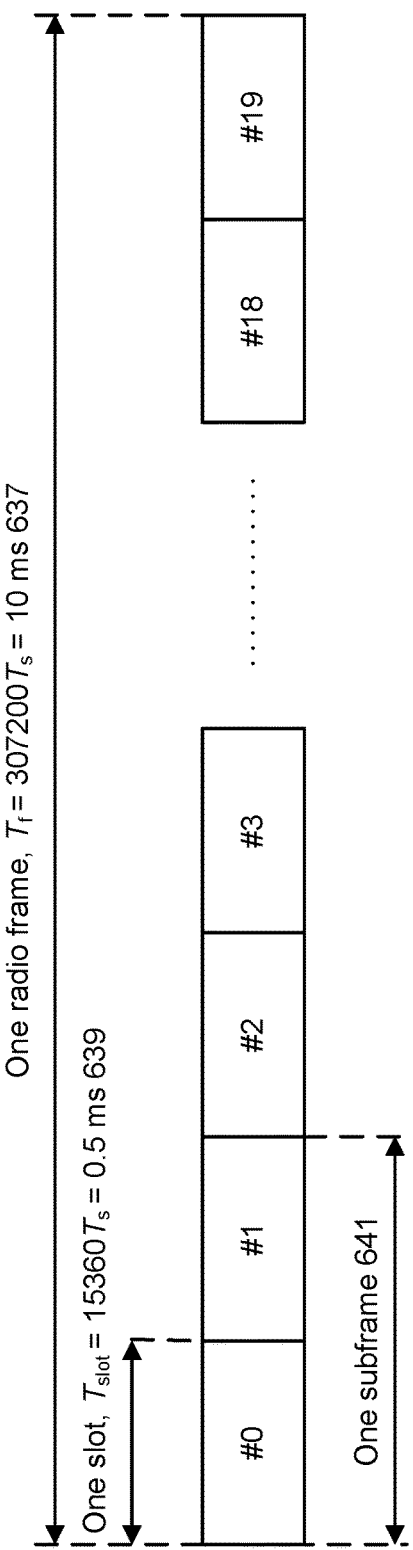
FIG. 6 is a diagram illustrating another example of a radio frame that may be used in accordance with the systems and methods disclosed herein.

In existing LTE networks, a transmission time interval (TTI) is a subframe with a length of 1 ms, and each subframe contains two slots. The TDD and FDD frame structures are shown in FIG. 5 and FIG. 6 respectively.

Each slot may include 7 or 6 symbols for a normal cyclic prefix (CP) and an extended CP respectively. A DL subframe or TTI may include 14 OFDM symbols for a normal CP and 12 OFDM symbols for an extended CP. An UL subframe or TTI may include 14 Single-carrier frequency-division multiple access (SC-FDMA) symbols for normal CP and 12 SC-FDMA symbols for extended CP. A special subframe in TDD (i.e., subframe type 2) may include a downlink pilot time slot (DwPTS) for DL, a gap period (GP) and an uplink pilot time slot (UpPTS) for UL transmissions.

The HARQ-ACK feedback of a PDSCH or PUSCH transmission can be reported at least 4 TTIs after. For FDD, the HARQ-ACK is always reported after 4 TTIs. For TDD, the HARQ-ACK timing is at least 4 TTIs after the transmission. The association timing may be much longer than 4 TTIs depending on the specific TDD UL/DL configuration.

Reduced latency techniques are a consideration in 3GPP. For example, specification impacts may be assessed and feasibility and performance of TTI lengths between 0.5 ms and one OFDM symbol may be studied, taking into account the impact on reference signals and physical layer control signaling. Furthermore, backwards compatibility should be preserved, thus allowing normal operation of pre-Release 13 UEs 102 on the same carrier.

A shortened TTI, is a transmission time interval with lengths between 0.5 ms and one OFDM symbol. A shortened TTI can also be referred as a short TTI (S-TTI, sTTI, s-TTI, Sh-TTI), shorten TTI or reduced TTI (R-TTI, rTTI, or r-TTI), etc.

Various S-TTI formats may be used for both UL and DL subframes based on the number of OFDM symbols. For normal CP, the candidate shortened TTI sizes ranges from 1 OFDM symbol, 2 symbols, 3 OFDM symbols, 4 OFDM symbols, and slot based 7 OFDM symbols.

With shortened TTIs, the processing time may also be reduced (e.g., as 4 shortened TTIs or even 2 shortened TTIs). The reduced feedback can effectively decrease the return trip time (RTT) and the latency observed at a higher layer.

For DL, to maintain backward compatibility, the PDCCH region may be reserved as in current specifications. The remaining OFDM symbols may be allocated for subframes with reduced TTI. For UL, the slot based structure may provide some backward compatibility because most of the reference signals and channel resources may be reused with minor enhancement.

Furthermore, different reduced TTI sizes may be included in a 1 ms subframe. Moreover, the TTI size of DL and UL may be the same. This may simplify the association timing design. Alternatively, the TTI size of DL and UL may be different.

There are several use cases that use TDD DL association timing. A single TDD serving cell and TDD CA with the same UL/DL configuration may rely on TDD DL association timing. Also, for a TDD cell with dynamic UL/DL reconfiguration (e.g., eIMTA), the PDSCH HARQ-ACK timing is determined based on a RRC configured DL reference configuration. TDD CA with different UL/DL configurations may utilize TDD DL association timing. Additionally, FDD-TDD CA with TDD as a PCell or TDD-FDD CA with TDD as a primary secondary cell (pSCell) in the case of dual connectivity may also use TDD DL association timing.

In LTE release 8 to 13, there are 7 TDD UL/DL configurations. For a TDD UL/DL configuration, a DL association set is defined for each UL subframe to report HARQ-ACK for PDSCH transmissions. The DL association set K: $\{k_0, k_1, \ldots k_{M-1}\}$ for TDD may be defined as shown in Table 1.

TABLE 1

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Moreover, a TDD cell may support dynamic UL/DL reconfiguration with traffic adaptation (i.e., an eIMTA cell) in which an RRC configured DL reference configuration is used to define the DL association set.

For FDD-TDD CA with TDD as the PCell, a DL association set may be defined for a FDD cell where all subframes can be DL subframes, as shown in Table 2. It should be noted that the downlink association set of an FDD cell for FDD-TDD CA is a superset of the downlink association set of the corresponding UL/DL configuration. Furthermore, since all FDD DL subframes are the same, the subframe indexes in the FDD DL association set are ordered sequentially based on the association distance. Comparatively, in the DL association set of the TDD cell, the special subframes are put at the end of the subframe indexes since they are unlikely to carry PDSCHs. The DL association set K: {k₀, k₁, . . . k_{M-1}} for FDD-TDD and a serving cell frame structure type 1 may be defined as shown in Table 2.

TABLE 2

| DL-reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

For TDD CA with different UL/DL configurations, two approaches are defined for a TDD SCell. One approach is to follow the DL association set of a DL reference configuration that is determined based on the combination of the PCell and the SCell UL/DL configurations. Another approach is to use the FDD DL association set defined for FDD-TDD CA on the TDD SCell.

The S-TTI is applicable to both FDD and TDD networks. With a reduced TTI, the potential number of PDSCH transmissions is increased, and the potential number of reporting UL TTIs is also increased. With reduced processing time, the feedback latency may also be reduced. For TDD, the HARQ-ACK can be reported earlier than what is defined by current DL association timing. Thus, new sets of DL associations may be defined. On the other hand, due to UL and DL allocation, the latency reduction may not be as big as in FDD cells where a fixed 4 TTI association timing is used. The following approaches optimize the DL association set of reduced TTI for a TDD CSI report cell.

With S-TTI, the approaches to determine the DL reference configuration of TDD CA with different UL/DL configurations can be reused. Two approaches can be defined for a TDD SCell. One approach is to follow the DL association set of a DL reference configuration that is determined based on the combination of the PCell and the SCell UL/DL configurations. Another approach is to use the FDD DL association set defined for FDD-TDD CA on the TDD SCell. The selection of a particular approach may be indicated by higher layer signaling. For FDD-TDD CA with PCell or pSCell as a TDD cell, the DL reference configuration of the FDD cell may be based on the PCell of pSCell TDD UL/DL configuration. In all cases, new DL association sets may be defined for TDD UL/DL configurations and for an FDD cell based on the PCell or sPCell UL/DL configuration.

For DL, S-TTI can be very flexible. Different S-TTI sizes may be considered, including 1 OFDM symbol, 2 OFDM symbols, 3 OFDM symbols, 4 OFDM symbols and slot based TTI. Among these options, the slot based TTI should be supported at least. And further reduced TTI is useful for flexible scheduling of DL resources.

To maintain backward compatibility, a subframe that contains S-TTIs may have a PDCCH region as with legacy LTE. The remaining OFDM symbols can be divided into S-TTIs. Therefore, a DL subframe may contain multiple S-TTIs. The S-TTIs may have the same TTI sizes, or may have different TTI sizes.

For UL, a slot based S-TTI may reuse most of the structures of the existing UL subframe format. Thus, a slot based S-TTI can provide better backward compatibility and may have less specification impact. For TDD, due to UL and DL allocation on the same carrier, the PDSCH HARQ-ACK feedback can only be reported on a subframe with UL allocation. For the HARQ-ACK feedback with reduced TTI, a very short TTI may not bring down the feedback delay of a PDSCH transmission for TDD serving cells.

Figure 7:
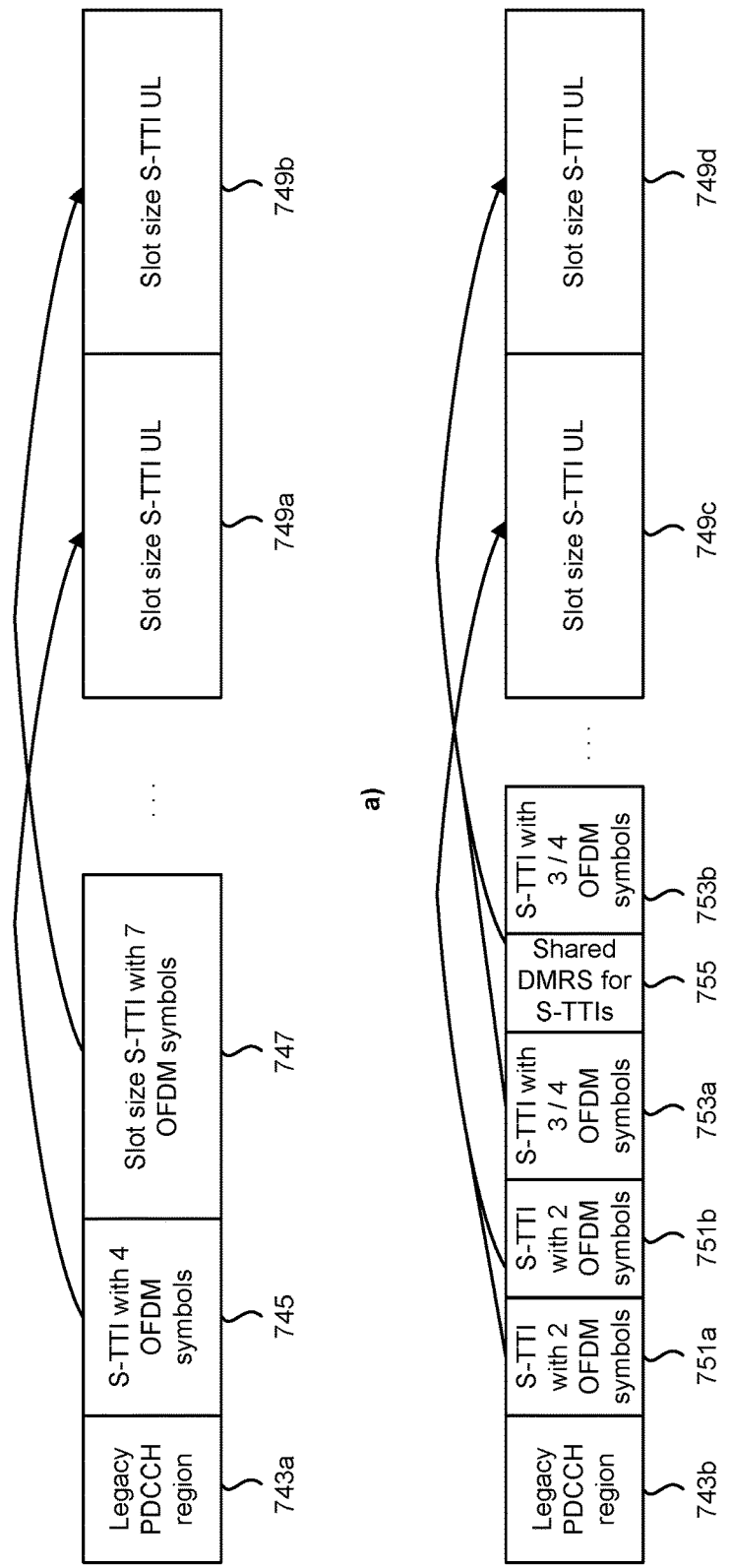
FIG. 7 illustrates examples of uplink (UL) shortened TTI (S-TTI) association with one or more downlink (DL) S-TTI.

Therefore, at least for TDD, to determine PDSCH HARQ-ACK timing, the basic slot based S-TTI should be used. One slot may contain multiple DL S-TTIs with the same or different TTI sizes. If there are multiple DL S-TTIs that end in a slot, the HARQ-ACK bits of these multiple S-TTIs may be aggregated and reported together in a S-TTI UL report. FIG. 7 shows two examples of UL S-TTI association with one or more DL S-TTI.

If the PCell is FDD, the FDD timing should be used on all serving cells. For FDD, the basic slot based S-TTI for UL can also be used to determine PDSCH HARQ-ACK timing with a fixed timing of a length of 4 slot based S-TTI (i.e., 4 slots or 2 ms). Also, one slot may contain multiple DL S-TTIs with the same or different TTI sizes. If there are multiple DL S-TTIs that end in a slot, the HARQ-ACK bits of these multiple S-TTIs may be aggregated and reported together in a S-TTI UL report. Furthermore, if the DL S-TTI and UL-S-TTI have the same length, the actual S-TTI sizes can be used to determine PDSCH HARQ-ACK timing with a fixed timing of a length of 4 S-TTI sizes.

Figure 8:
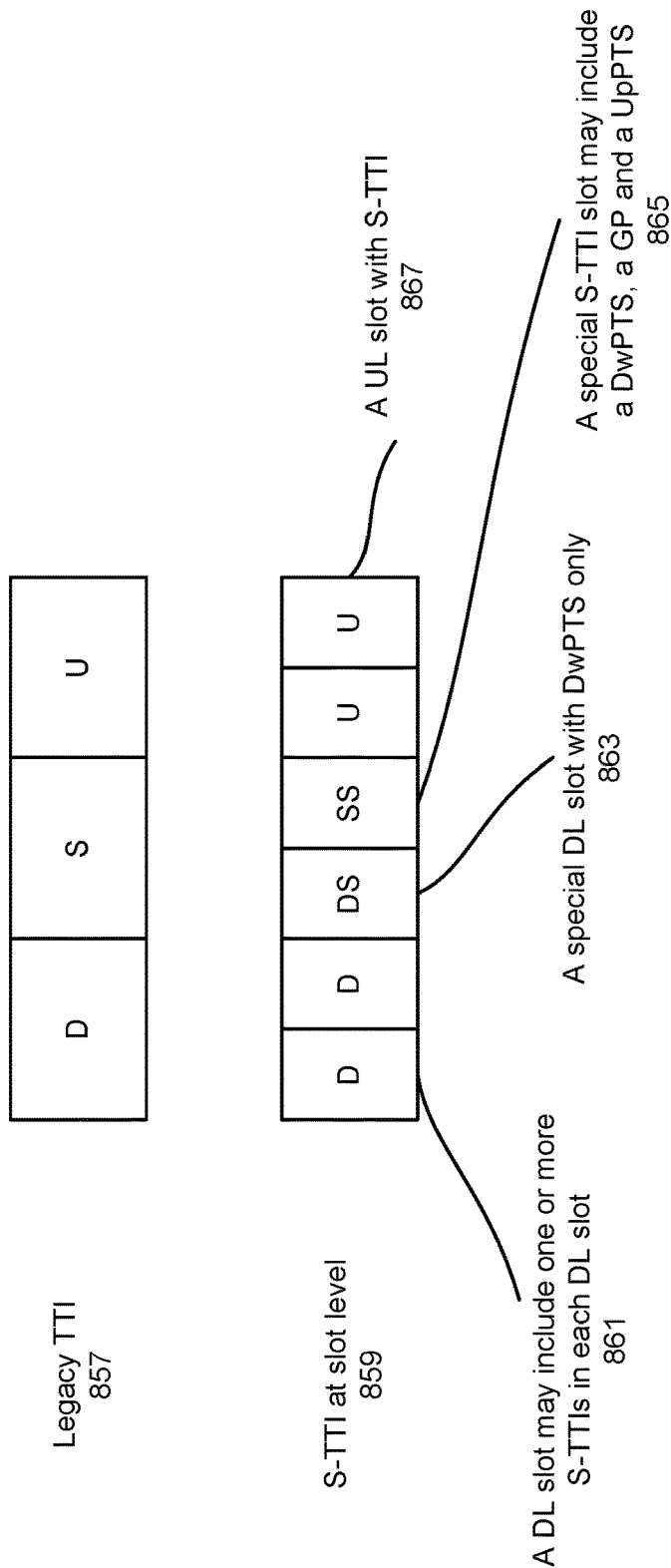
FIG. 8 illustrates slot based association slots for S-TTI.

The DL association sets and timing are described herein. In the following context, slot based S-TTIs are illustrated. As described above, in the case of multiple S-TTIs within a slot, the HARQ-ACK of multiple S-TTIs may be aggregated and reported. An example of different kinds of S-TTI slots for different types of subframes is illustrated in FIG. 8.

As described above, for TDD networks with shortened TTI (S-TTI), several approaches of DL association sets may be used. In a first approach (Approach 1), existing TDD timing may be reused. To minimize specification changes, the current DL association timing can be reused in a slot level. This provides good backward compatibility. However, this approach may not reduce the round trip time (RTT) of TTI transmissions.

It should be noted that the current DL associate sets are measured in 1 ms TTI sizes. To apply to a slot based TTI size, the association distance should be multiplied by 2. Several cases are described. In a first case, S-TTI is applied only at DL, exiting UL TTI is maintained. In this case, the existing DL association sets can be used for the PDSCH HARQ-ACK report timing with the addition of multiple DL S-TTIs included in a DL TTI of the DL association set. Thus, the HARQ-ACK payload sizes will be increased.

In a second case, S-TTI is applied on both UL and DL. In this case, the UL S-TTI is slot based (e.g., 7 symbols with normal CP and 6 symbols with extended CP). The DL S-TTI can be more flexible with 1, 2, 3, 4 symbols or slot based. The DL association sets may be indicated based on S-TTI with slot structure. If there are multiple DL S-TTIs ending in a slot, multiple HARQ-ACK bits may be reported to the corresponding association.

Figure 9:
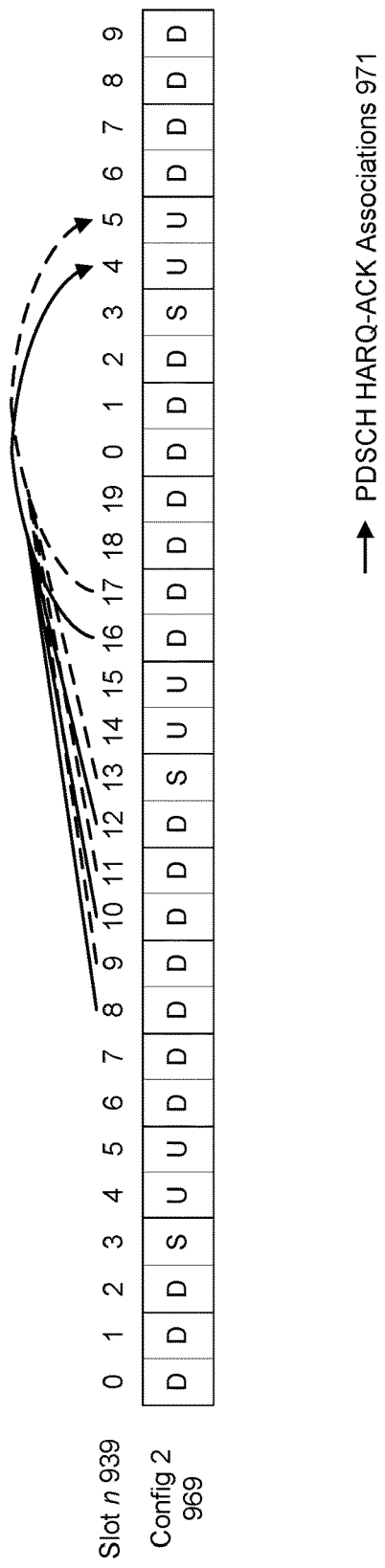
FIG. 9 is a diagram illustrating an example of a time division duplex (TDD) DL association set by reusing existing timing at slot level.

With slot based UL S-TTI, the downlink association tables are given in Table 3. Specifically, Table 3 shows the DL association set K: $\{k_0, k_1, \ldots k_{M-1}\}$ for TDD in the number of slots with slot based UL S-TTI. Table 4 shows the downlink association set for an FDD cell in a case of TDD-FDD CA with a TDD PCell. Specifically, Table 4 shows the DL association set K: $\{k_0, k_1, \ldots k_{M-1}\}$ for FDD-TDD and serving cell frame structure type 1 in the number of slots with slot based UL S-TTI. It should be noted that the association distance is measured by the number of slots instead of subframes in these tables. The minimum association distance is 8 slot based S-TTIs, which is 4 ms. This is the same as the current specifications. Each UL S-TTI is associated with the S-TTI of the same slot location in DL association set. Thus, this approach may not effectively reduce the RTT even with S-TTIs. FIG. 9 shows an example of TDD DL association set by reusing existing timing at slot level with TDD UL/DL configuration 2.

TABLE 3

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| | Slot n | | | | | | | | | |
| | 0, 1 | 2, 3 | 4, 5 | 6, 7 | 8, 9 | 10, 11 | 12, 13 | 14, 15 | 16, 17 | 18, 19 |
| 0 | — | — | 12 | — | 8 | — | — | 12 | — | 8 |
| 1 | — | — | 14, 12 | 8 | — | — | — | 14, 12 | 8 | — |
| 2 | — | — | 16, 14, 8, 12 | — | — | — | — | 16, 14, 8, 12 | — | — |
| 3 | — | — | 14, 12, 22 | 12, 10 | 10, 8 | — | — | — | — | — |
| 4 | — | — | 24, 16, 14, 22 | 12, 10, 8, 14 | — | — | — | — | — | — |
| 5 | — | — | 26, 24, 18, 16, 14, 10, 8, 22, 12 | — | — | — | — | — | — | — |
| 6 | — | — | 14 | 14 | 10 | — | — | 14 | 14 | — |

TABLE 4

| DL-reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| | Slot n | | | | | | | | | |
| | 0, 1 | 2, 3 | 4, 5 | 6, 7 | 8, 9 | 10, 11 | 12, 13 | 14, 15 | 16, 17 | 18, 19 |
| 0 | — | — | 12, 10 | 10, 8 | 8 | — | — | 12, 10 | 10, 8 | 8 |
| 1 | — | — | 14, 12 | 12, 10, 8 | — | — | — | 14, 12 | 12, 10, 8 | — |
| 2 | — | — | 16, 14, 12, 10, 8 | — | — | — | — | 16, 14, 12, 10, 8 | — | — |
| 3 | — | — | 22, 20, 18, 16, 14, 12 | 12, 10 | 10, 8 | — | — | — | — | — |
| 4 | — | — | 24, 22, 20, 18, 16, 14 | 14, 12, 10, 8 | — | — | — | — | — | — |
| 5 | — | — | 26, 24, 22, 20, 18, 16, 14, 12, 10, 8 | — | — | — | — | — | — | — |
| 6 | — | — | 16, 14 | 14, 12 | 12, 10 | — | — | 14 | 14, 12, 10 | — |

In a second approach (Approach 2), the association set based on an S-TTI UL slot structure may be optimized for TDD configurations. With S-TTI, more UL TTIs are available to carry PDSCH HARQ-ACK reporting. Furthermore, the processing time can be reduced with S-TTI even if a minimum of 4 S-TTIs is maintained. To reduce the RTT and fully utilize the available UL S-TTIs, new S-TTI DL association sets can be defined.

The new association sets can be optimized for each UL/DL configuration. The FDD DL association set may be defined as a superset of TDD DL association set. Several criteria may be used to design the DL association set. For example, the minimum distance between a DL and UL S-TTI may be 4 S-TTIs. The number of associated subframes may be evenly distributed into the UL S-TTIs. The total distance may be minimized. Furthermore, efforts may be made to avoid spreading the slot S-TTIs in a subframe into different DL association sets.

Tables 5A and 5B provide an example of a DL association set optimized for each TDD UL/DL configuration. Table 5A shows the first five subframes (i.e., subframes 0-4) and Table 5B continues with the remaining five subframes (i.e., subframes 5-9). Compared with the current association timing as in Table 3, the DL association set in Tables 5A and 5B has a much shorter association gap between the DL and the corresponding S-TTI UL.

The 3a UL/DL Configuration in Tables 5A and 5B shows an alternative option for UL/DL configuration 3 to distribute the bits into slot 8 and slot 9. However, S-TTI special DL and S-TTI special subframe in the original special subframe are more likely to not be scheduled for PDSCH transmission. Thus, the actual payload in slot 9 may be smaller. Therefore, the association set of 3 in Tables 5A and 5B may be more reasonable although it seems the association sets are not well balanced. FIG. 10 shows the DL association sets with slot based S-TTI and the corresponding uplink reporting timings.

Tables 6A and 6B show the FDD DL association set with FDD-TDD CA when the PCell or pSCell is a TDD cell. The FDD DL association set is a superset of the corresponding TDD DL association set with additional association S-TTIs linked to the closest UL S-TTI. Furthermore, the TTI indexes are in the order of distance from the uplink subframe. However, since the DL association set is optimized for the TDD UL/DL configuration, the FDD DL association set is not very balanced for some UL/DL configurations (e.g., in UL/DL configuration 3 and 6).

TABLE 5A

| UL/DL Config- | Subframe n | | | | | | | | | |
|---|---|---|---|---|---|---|---|---|---|---|
| | 0 | 1 | | | 2 | | 3 | | 4 | |
| | Slot n | | | | | | | | | |
| uration | 0 | 1 | 2 | 3 | 4 | 5 | 6 | 7 | 8 | 9 |
| 0 | — | — | — | — | 4 | 4 | 4 | 4 | — | — |
| 1 | — | — | — | — | 6 | 6 | 6, 5 | 5, 4 | — | — |
| 2 | — | — | — | — | 8, 7, 12, 11 | 7, 6, 5, 4 | — | — | — | — |
| 3 | — | — | — | — | 14, 13 | 13, 12 | 12, 11 | 11, 10 | 10, 9 | 9, 8, 7, 6 |
| 3a | | | | | 14, 13 | 13, 12 | 12, 11 | 11, 10 | 10, 9, 8 | 8, 7, 6 |
| 4 | — | — | — | — | 16, 15, 14, 13 | 13, 12, 11, 10 | 10, 9, 8, 7 | 7, 6, 5, 4 | — | — |
| 5 | — | — | — | — | 18, 17, 16, 15, 14, 13, 12, 22, 21 | 12, 11, 10, 9, 8, 7, 6, 5, 4 | — | — | — | — |
| 6 | — | — | — | — | 6 | 6 | 6 | 6 | 6 | 6 |

TABLE 5B

| UL/DL Config- | Subframe n | | | | | | | | | |
|---|---|---|---|---|---|---|---|---|---|---|
| | 5 | | 6 | | 7 | | 8 | | 9 | |
| | Slot n | | | | | | | | | |
| uration | 10 | 11 | 12 | 13 | 14 | 15 | 16 | 17 | 18 | 19 |
| 0 | — | — | — | — | 4 | 4 | 4 | 4 | — | — |
| 1 | — | — | — | — | 6 | 6 | 6, 5 | 5, 4 | — | — |
| 2 | — | — | — | — | 8, 7, 12, 11 | 7, 6, 5, 4 | — | — | — | — |
| 3 | — | — | — | — | — | — | — | — | — | — |
| 3a | — | — | — | — | — | — | — | — | — | — |
| 4 | — | — | — | — | — | — | — | — | — | — |
| 5 | — | — | — | — | — | — | — | — | — | — |
| 6 | — | — | — | — | 4 | 4 | 4 | 4 | — | — |

TABLE 6A

| UL/DL Configuration | Subframe n | | | | | | | | | |
|---|---|---|---|---|---|---|---|---|---|---|
| | 0 | | 1 | | 2 | | 3 | | 4 | |
| | Slot n | | | | | | | | | |
| | 0 | 1 | 2 | 3 | 4 | 5 | 6 | 7 | 8 | 9 |
| 0 | — | — | — | — | 8, 7, 6, 5, 4 | 4 | 4 | 4 | 4 | 4 |
| 1 | — | — | — | — | 10, 9, 8, 7, 6 | 6 | 6, 5 | 5, 4 | — | — |
| 2 | — | — | — | — | 12, 11, 10, 9, 8, 7 | 7, 6, 5, 4 | — | — | — | — |
| 3 | — | — | — | — | 18, 17, 16, 15, 14, 13 | 13, 12 | 12, 11 | 11, 10 | 10, 9 | 9, 8, 7, 6, 5, 4 |
| 3a | | | | | 18, 17, 16, 15, 14, 13 | 13, 12 | 12, 11 | 11, 10 | 10, 9, 8 | 8, 7, 6, 5, 4 |
| 4 | — | — | — | — | 20, 19, 18, 17, 16, 15, 14, 13 | 13, 12, 11, 10 | 10, 9, 8, 7 | 7, 6, 5, 4 | — | — |
| 5 | — | — | — | — | 22, 21, 20, 19, 18, 17, 16, 15, 14, 13, 12 | 12, 11, 10, 9, 8, 7, 6, 5, 4 | — | — | — | — |
| 6 | — | — | — | — | 10, 9, 8, 7, 6 | 6 | 6 | 6 | 6 | 6, 5, 4 |

TABLE 6B

| UL/DL Configuration | Subframe n | | | | | | | | | |
|---|---|---|---|---|---|---|---|---|---|---|
| | 5 | | 6 | | 7 | | 8 | | 9 | |
| | Slot n | | | | | | | | | |
| | 10 | 11 | 12 | 13 | 14 | 15 | 16 | 17 | 18 | 19 |
| 0 | — | — | — | — | 8, 7, 6, 5, 4 | 4 | 4 | 4 | 4 | 4 |
| 1 | — | — | — | — | 10, 9, 8, 7, 6 | 6 | 6, 5 | 5, 4 | — | — |
| 2 | — | — | — | — | 12, 11, 10, 9, 8, 7 | 7, 6, 5, 4 | — | — | — | — |
| 3 | — | — | — | — | — | | | | | |
| 3a | — | — | — | — | — | | | | | |
| 4 | — | — | — | — | — | | | | | |
| 5 | — | — | — | — | — | | | | | |
| 6 | — | — | — | — | 8, 7, 6, 5, 4 | 4 | 4 | 4 | — | — |

Figure 11A:
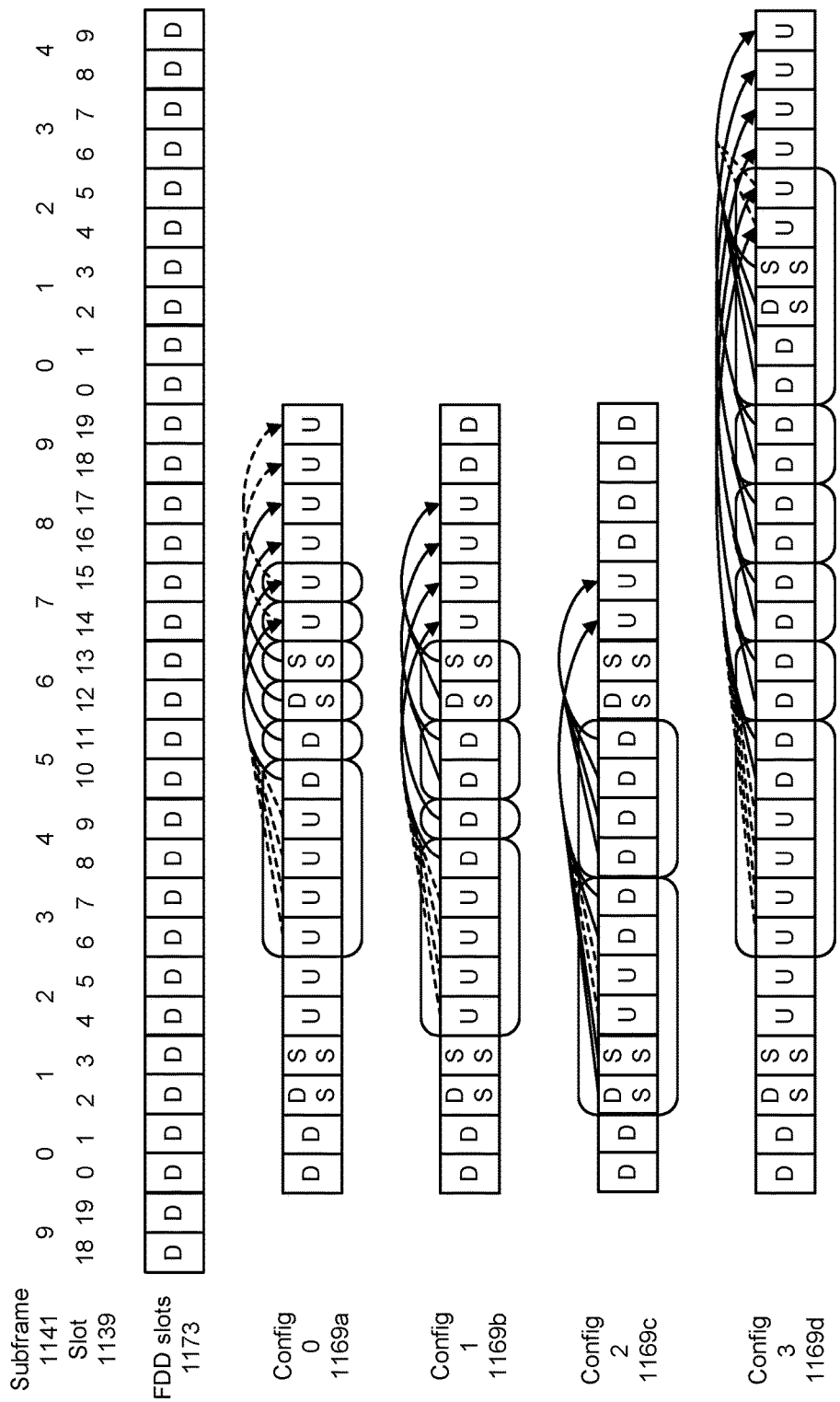
FIGS. 11A and 11B illustrate frequency division duplex (FDD) DL association sets based on TDD UL/DL configurations.
Figure 11B:
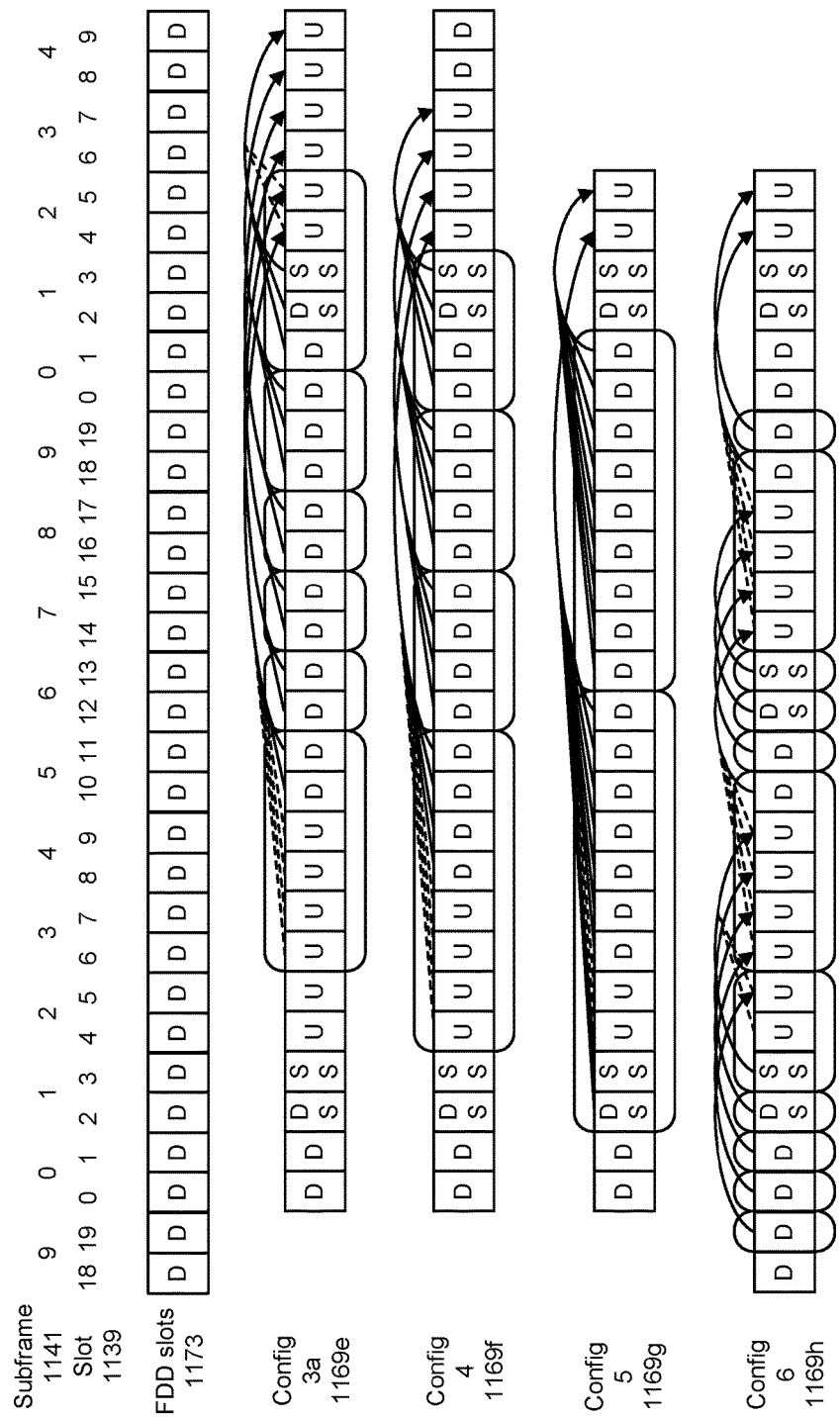

FIGS. 11A and 11B illustrate the FDD cell DL association set based on TDD UL/DL configuration. The FDD DL association set is extended from the TDD DL association set with newly added associations indicated in the dashed lines in FIGS. 11A and 11B. Each box in FIGS. 11A and 11B shows a subframe set associated with a slot based S-TTI UL.

In a third approach (Approach 3), the DL association set may be based on an S-TTI UL slot structure optimized for FDD. In LTE release 12, FDD-TDD CA is already supported, and a DL association set for FDD is defined as a superset of TDD PCell UL/DL configuration. In Approach 2 described above, the DL association set is not optimized for FDD cell. The FDD DL association set can also be used for TDD CA with different UL/DL configurations if configured.

On the other hand, if an optimized FDD set is defined based on the TDD Pcell or pSCell configuration, the DL association set may be applied to any TDD UL/DL configurations as well as FDD SCells. This may be a totally new design. Although this design is not optimized for a particular TDD configuration, the overall bit distribution is much better than that of Approach 2.

Tables 7A and 7B show some examples of DL association timing optimized for FDD based on the PCell or pSCell UL/DL configuration. FIG. 12 illustrates the DL association set optimized for FDD based on the PCell or pSCell UL/DL configuration. Each box in FIG. 12 shows a subframe set associated with a slot based S-TTI UL.

TABLE 7A

| UL/DL Configuration | Subframe n | | | | | | | | | |
|---|---|---|---|---|---|---|---|---|---|---|
| | 0 | | 1 | | 2 | | 3 | | 4 | |
| | Slot n | | | | | | | | | |
| | 0 | 1 | 2 | 3 | 4 | 5 | 6 | 7 | 8 | 9 |
| 0 | — | — | — | — | 8, 7 | 7, 6 | 6, 5 | 5, 4 | 4 | 4 |
| 1 | — | — | — | — | 10, 9, 8 | 8, 7, 6 | 6, 5 | 5, 4 | — | — |
| 2 | — | — | — | — | 12, 11, 10, 9, 8 | 8, 7, 6, 5, 4 | — | — | — | — |
| 3 | — | — | — | — | 18, 17, 16, 15 | 15, 14, 13, 12 | 12, 11, 10 | 10, 9, 8 | 8, 7, 6 | 6, 5, 4 |
| 3a | — | — | — | — | 18, 17, 16, 15 | 15, 14, 13 | 13, 12, 11 | 11, 10, 9 | 9, 8, 7 | 7, 6, 5, 4 |
| 4 | — | — | — | — | 20, 19, 18, 17, 16 | 16, 15, 14, 13, 12 | 12, 11, 10, 9, 8 | 8, 7, 6, 5, 4 | — | — |

TABLE 7A-continued

| UL/DL Config-uration | Subframe n | | | | | | | | | |
|---|---|---|---|---|---|---|---|---|---|---|
| | 0 | 1 | 2 | | 3 | | 4 | | | |
| | | | Slot n | | | | | | | |
| | 0 | 1 | 2 | 3 | 4 | 5 | 6 | 7 | 8 | 9 |
| 5 | — | — | — | — | 22, 21, 20, 19, 18, 17, 16, 15, 14, 13 | 13, 12, 11, 10, 9, 8, 7, 6, 5, 4 | — | — | — | — |
| 6 | — | — | — | — | 10, 9 | 9, 8 | 8, 7 | 7, 6 | 6, 5 | 5, 4 |

TABLE 7B

| UL/DL Config-uration | Subframe n | | | | | | | | | |
|---|---|---|---|---|---|---|---|---|---|---|
| | 5 | 6 | | 7 | | 8 | | 9 | | |
| | | | | Slot n | | | | | | |
| | 10 | 11 | 12 | 13 | 14 | 15 | 16 | 17 | 18 | 19 |
| 0 | — | — | — | — | 8, 7 | 7, 6 | 6, 5 | 5, 4 | 4 | 4 |
| 1 | — | — | — | — | 10, 9, 8 | 8, 7, 6 | 6, 5 | 5, 4 | — | — |
| 2 | — | — | — | — | 12, 11, 10, 9, 8 | 8, 7, 6, 5, 4 | — | — | — | — |
| 3 | — | — | — | — | — | — | — | — | — | — |
| 3a | — | — | — | — | — | — | — | — | — | — |
| 4 | — | — | — | — | — | — | — | — | — | — |
| 5 | — | — | — | — | — | — | — | — | — | — |
| 6 | — | — | — | — | 8, 7 | 7, 6 | 6, 5 | 5, 4 | — | — |

With regard to the applicability and indication of DL association sets selection, the DL association sets defined in Approach 2 and Approach 3 have their own advantages and disadvantages. Approach 2 and Approach 3 may be applied independently or separately.

In one case, only one set of DL association sets may be adopted and applied to TDD CA and FDD-CA. For example, only the DL association sets of Approach 2 may be defined and applied. Alternatively, only the DL association sets of Approach 3 may be defined and applied.

In another case, the DL association sets of both Approach 2 and Approach 3 may be specified. The selection of which sets are used may be indicated by higher layer signaling.

In yet another case, the DL association sets of both Approach 2 and Approach 3 may be specified. The selection of which sets are used may depend on the CA condition. In one implementation, in TDD CA, the DL association sets of Approach 2 are used. For FDD-TDD CA with a TDD cell as a PCell or pSCell, a TDD SCell may use the DL association sets of Approach 2, and a FDD SCell may use DL association sets of Approach 3. In another implementation, in TDD CA, the DL association sets of Approach 2 may be used. For FDD-TDD CA with a TDD cell as a PCell or pSCell, all TDD and FDD SCells may use the DL association sets of Approach 3.

Moreover, to reduce the complexity of defining DL association sets for all UL/DL configurations. Only a subset of UL/DL configurations may be defined as DL reference TDD configurations. The DL association sets and PDSCH HARQ-ACK timing may follow the DL association set of the configured DL reference configuration. The DL association sets of the DL reference TDD configuration may be given in Approach 2 and/or Approach 3 above. For example, only UL/DL configuration 2, 4, 5 can be configured as DL reference configuration by higher layer signaling (e.g. RRC signaling).

Similar to an eIMTA cell, UL/DL configuration 2 can be used as a DL reference configuration for cells with UL/DL configuration 0, 1, 2, 6. Also, UL/DL configuration 4 can be used as a DL reference configuration for cells with UL/DL configuration 0, 1, 3, 4, 6. Furthermore, UL/DL configuration 5 can be used as a DL reference configuration for cells with UL/DL configuration 0, 1, 2, 3, 4, 5, 6.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB S-TTI operations module 194.

The eNB S-TTI operations module 194 may acquire HARQ-ACK information of one or more PDSCH(s) based on a DL association set with S-TTI for the serving cell. This may be accomplished as described above.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
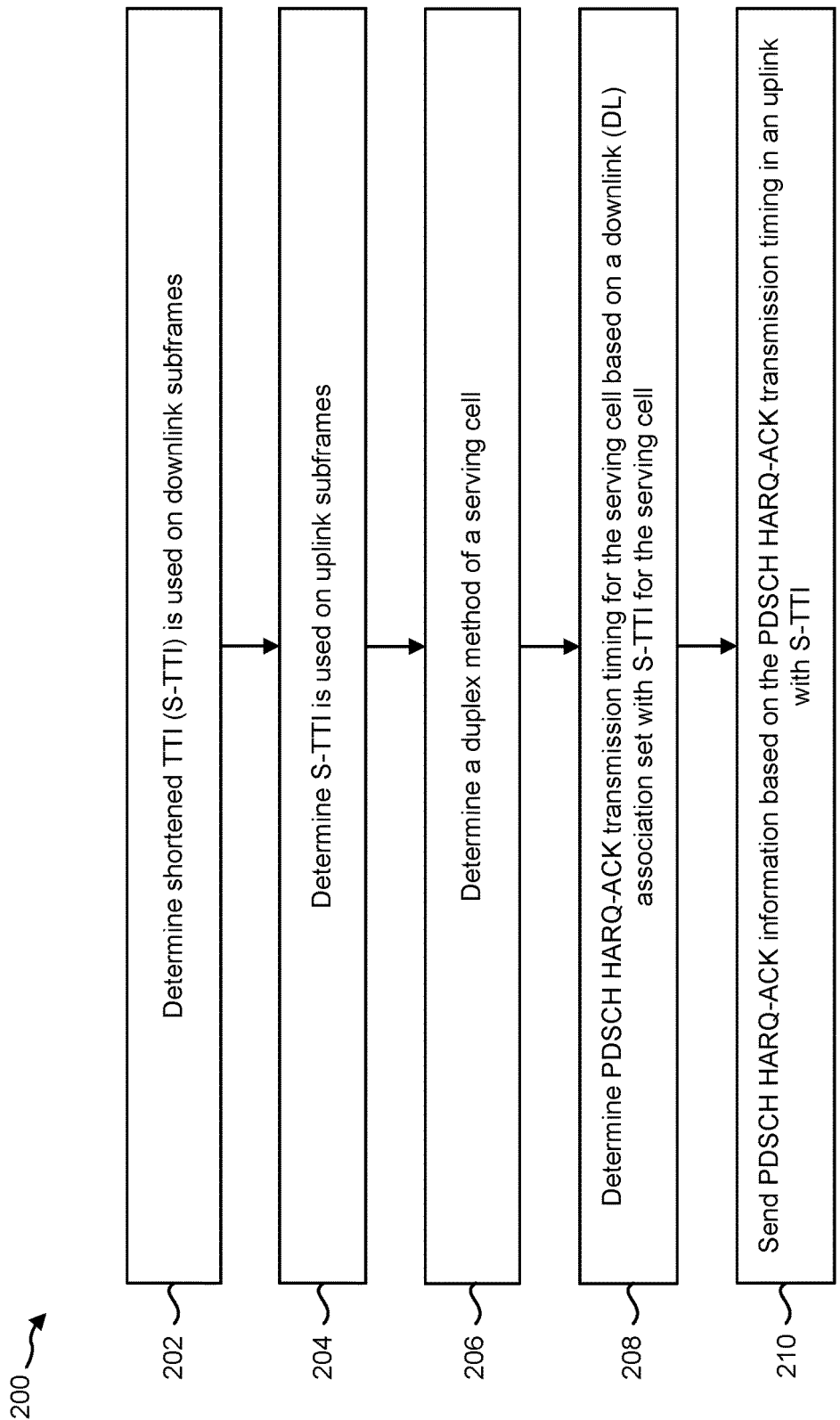
FIG. 2 is a flow diagram illustrating a method for association timing by a UE.

FIG. 2 is a flow diagram illustrating a method 200 for association timing by a UE 102. The UE 102 may communicate with one or more eNBs 160 in a wireless communication network. In one implementation, the wireless communication network may include an LTE network.

The UE 102 may determine 202 that a shortened transmission time interval (S-TTI) is used on downlink subframes. The S-TTI on downlink subframes may be one or more of S-TTI formats including slot based, 1 OFDM symbol, 2 OFDM symbols, 3 OFDM symbols and 4 OFDM symbols.

The UE 102 may determine 204 that S-TTI is used on uplink subframes. The S-TTI on uplink subframes may be slot based.

The UE 102 may determine 206 a duplex method of a serving cell. For example, the serving cell may be a TDD cell or an FDD cell.

The UE 102 may determine 208 PDSCH HARQ-ACK transmission timing for the serving cell based on a DL association set with S-TTI for the serving cell. In one approach, if the serving cell is a TDD cell, then determining the DL association set with S-TTI for the serving cell may include obtaining the DL association set with S-TTI for the serving cell by a table for a TDD cell DL association set with S-TTI using a DL-reference UL/DL configuration of the serving cell as an input of the table. The DL-reference UL/DL configuration of the serving cell may be determined based on the DL-reference configuration of a primary cell or a primary secondary cell (pSCell) and the UL/DL configuration of the serving cell.

In another approach, if the serving cell is a TDD cell, then determining the DL association set with S-TTI for the serving cell may include obtaining the DL association set with S-TTI for the serving cell by a table for a FDD cell DL association set with S-TTI using a DL-reference UL/DL configuration of the serving cell as an input of the table.

In yet another approach, if the serving cell is a FDD cell, then determining the DL association set with S-TTI for the serving cell comprises obtaining the DL association set with S-TTI for the serving cell by a table for a FDD cell DL association set with S-TTI using a DL-reference UL/DL configuration of a primary cell as an input of the table.

In an implementation, the DL association set with S-TTI maintains a timing of legacy TDD and FDD DL association sets at a slot level. In another implementation, the DL association set with S-TTI is optimized for TDD UL/DL configurations and FDD DL association sets as a superset of a TDD DL association set of a DL-reference UL/DL configuration of a primary cell. In yet another implementation, the DL association set with S-TTI is optimized for FDD based on a DL-reference UL/DL configuration of a primary cell or pSCell.

The UE 102 may send 210 PDSCH HARQ-ACK information based on the PDSCH HARQ-ACK transmission timing in an uplink with S-TTI. This may be done as described above.

Figure 3:
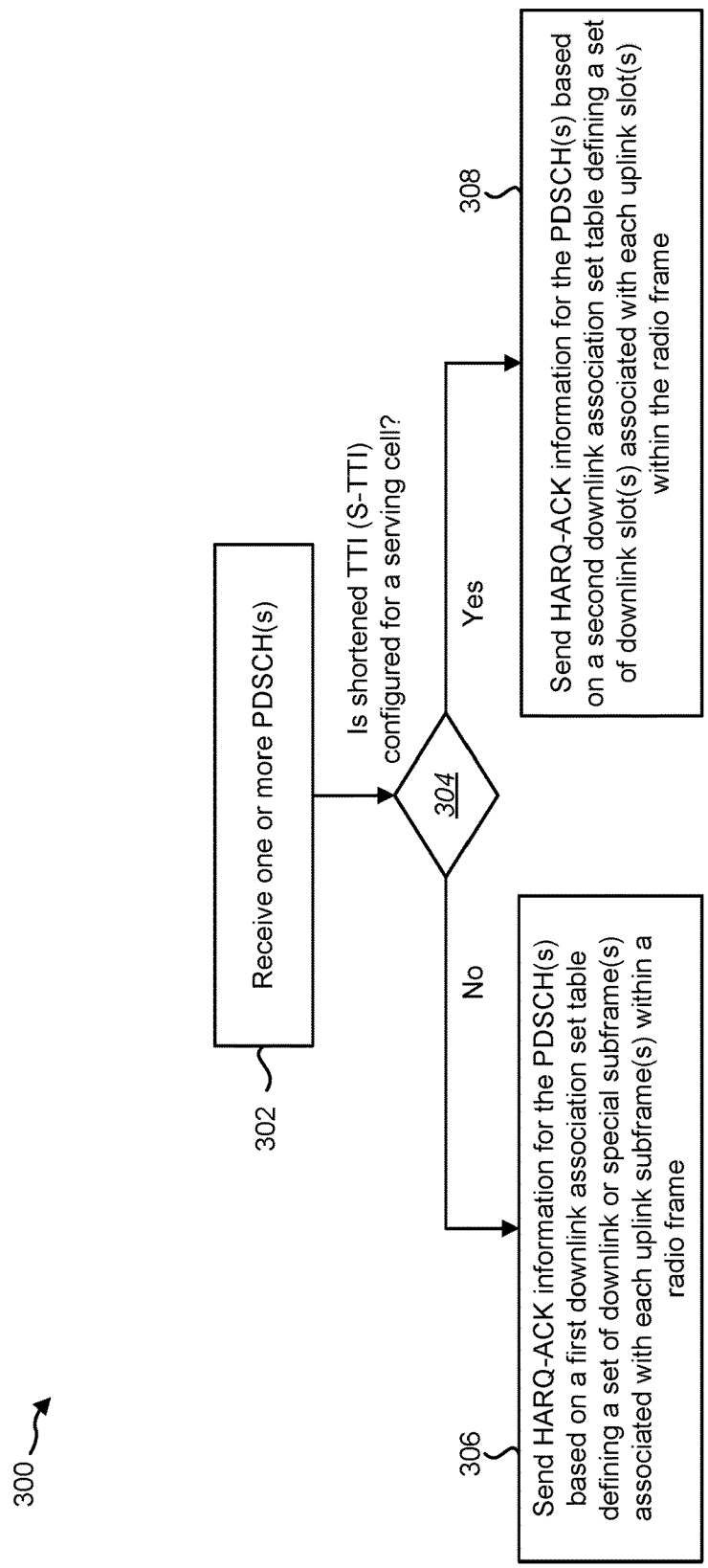
FIG. 3 is a flow diagram illustrating another method by a UE.

FIG. 3 is a flow diagram illustrating another method 300 by a UE 102. The UE 102 may communicate with one or more eNBs 160 in a wireless communication network. In one implementation, the wireless communication network may include an LTE network.

The UE 102 may receive 302 one or more PDSCH(s). The UE 102 may determine 304 whether an S-TTI is configured for a serving cell.

If the S-TTI is not configured, then the UE 102 may send 306 the HARQ-ACK information for the PDSCH(s) based on a first downlink association set table. The first downlink association set table may define a set of downlink or special subframe(s) associated with each uplink subframe(s) within a radio frame.

If the UE 102 determines 304 that the S-TTI is configured, then the UE 102 may send 308 HARQ-ACK information for the PDSCH(s) based on a second downlink association set table. The second downlink association set table may define a set of downlink slot(s) associated with each of uplink slot(s) within the radio frame.

Figure 4:
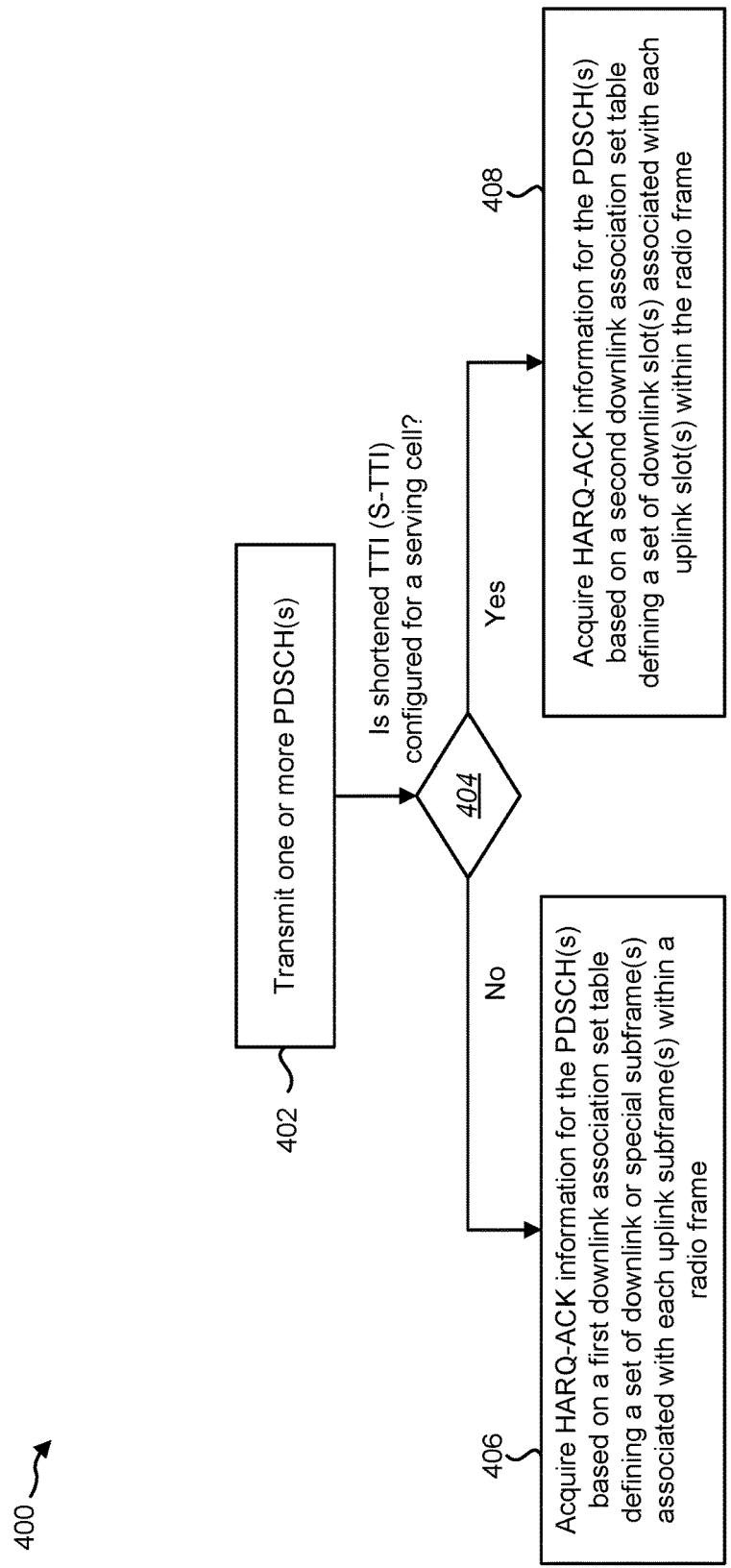
FIG. 4 is a flow diagram illustrating a method for association timing by an eNB.

FIG. 4 is a flow diagram illustrating a method 400 for association timing by an eNB 160. The eNB 160 may communicate with one or more UEs 102 in a wireless communication network. In one implementation, the wireless communication network may include an LTE network.

The eNB 160 may transmit 402 one or more PDSCH(s). The eNB 160 may determine 404 whether an S-TTI is configured for a serving cell.

If the S-TTI is not configured, then the eNB 160 may acquire 406 HARQ-ACK information for the PDSCH(s) based on a first downlink association set table. The first downlink association set table may define a set of downlink or special subframe(s) associated with each uplink subframe(s) within a radio frame.

If the eNB 160 determines 404 that the S-TTI is configured, then the eNB 160 may acquire 408 HARQ-ACK information for the PDSCH(s) based on a second downlink association set table. The second downlink association set table may define a set of downlink slot(s) associated with each of uplink slot(s) within the radio frame.

FIG. 5 is a diagram illustrating one example of a radio frame 535 that may be used in accordance with the systems and methods disclosed herein. This radio frame 535 structure illustrates an FDD structure. Each radio frame 535 may have a length of $T_f = 307200 \cdot T_s = 10$ ms, where $T_f$ is a radio frame 535 duration and $T_s$ is a time unit equal to $$\frac{1}{(15000 \times 2048)}$$

seconds. The radio frame 535 may include two half-frames 533, each having a length of $153600 \cdot T_s = 5$ ms. Each half-frame 533 may include five subframes 523a-e, 523f-j each having a length of $30720 \cdot T_s = 1$ ms.

TDD UL/DL configurations 0-6 are given below in Table 8 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 8 below. In Table 8, "D" denotes a downlink subframe, "S" denotes a special subframe and "U" denotes a UL subframe.

TABLE 8

| TDD UL/DL Config- uration Number | Downlink- to-Uplink Switch- Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 8 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 9 (from Table 4.2-1 of 3GPP TS 36.211) subject to the total length of DwPTS, GP and UpPTS being equal to $30720 \cdot T_s = 1$ ms. In Table 9, "cyclic prefix" is abbreviated as "CP" and "configuration" is abbreviated as "Config" for convenience.

TABLE 9

|  | Normal CP in downlink | | | Extended CP in downlink | | |
| --- | --- | --- | --- | --- | --- | --- |
|  |  | UpPTS | | | UpPTS | |
| Special Subframe Config | DwPTS | Normal CP in uplink | Extended CP in uplink | DwPTS | Normal CP in uplink | Extended CP in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ |  |  | 20480 · $T_s$ |  |  |
| 2 | 21952 · $T_s$ |  |  | 23040 · $T_s$ |  |  |
| 3 | 24144 · $T_s$ |  |  | 25600 · $T_s$ |  |  |
| 4 | 26336 · $T_s$ |  |  | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ |  |  |
| 6 | 19760 · $T_s$ |  |  | 23040 · $T_s$ |  |  |
| 7 | 21952 · $T_s$ |  |  | — | — | — |
| 8 | 24144 · $T_s$ |  |  | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 523 that may be used include a downlink subframe, an uplink subframe and a special subframe 531. In the example illustrated in FIG. 5, which has a 5 ms periodicity, two standard special subframes 531a-b are included in the radio frame 535. The remaining subframes 523 are normal subframes 537.

The first special subframe 531a includes a downlink pilot time slot (DwPTS) 525a, a guard period (GP) 527a and an uplink pilot time slot (UpPTS) 529a. In this example, the first standard special subframe 531a is included in subframe one 523b. The second standard special subframe 531b includes a downlink pilot time slot (DwPTS) 525b, a guard period (GP) 527b and an uplink pilot time slot (UpPTS) 529b. In this example, the second standard special subframe 531b is included in subframe six 523g. The length of the DwPTS 525a-b and UpPTS 529a-b may be given by Table 4.2-1 of 3GPP TS 36.211 (illustrated in Table 9 above) subject to the total length of each set of DwPTS 525, GP 527 and UpPTS 529 being equal to 30720. $T_s$=1 ms.

Each subframe i 523a-j (where i denotes a subframe ranging from subframe zero 523a (e.g., 0) to subframe nine 523j (e.g., 9) in this example) is defined as two slots, 2i and 2i+1 of length $T_{slot}$=15360·$T_s$=0.5 ms in each subframe 523. For example, subframe zero (e.g., 0) 523a may include two slots, including a first slot.

UL/DL configurations with both 5 ms and 10 ms downlink-to-uplink switch-point periodicity may be used in accordance with the systems and methods disclosed herein. FIG. 5 illustrates one example of a radio frame 535 with 5 ms switch-point periodicity. In the case of 5 ms downlink-to-uplink switch-point periodicity, each half-frame 533 includes a standard special subframe 531a-b. In the case of 10 ms downlink-to-uplink switch-point periodicity, a special subframe 531 may exist in the first half-frame 533 only.

Subframe zero (e.g., 0) 523a and subframe five (e.g., 5) 523f and DwPTS 525a-b may be reserved for downlink transmission. The UpPTS 529a-b and the subframe(s) immediately following the special subframe(s) 531a-b (e.g., subframe two 523c and subframe seven 523h) may be reserved for uplink transmission. It should be noted that, in some implementations, special subframes 531 may be considered DL subframes in order to determine a set of DL subframe associations that indicate UCI transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

FIG. 6 is a diagram illustrating another example of a radio frame 637 that may be used in accordance with the systems and methods disclosed herein. This radio frame 637 structure illustrates a TDD structure. Each radio frame 637 may have a length of $T_f=307200 \cdot T_s=10$ ms, where $T_f$ is a radio frame 637 duration and $T_s$ is a time unit equal to $$\frac{1}{(15000 \times 2048)}$$

seconds.

The radio frame 637 may include subframes 641. Each subframe 641 is defined as two slots 639 of length $T_{slot}=15360 \cdot T_s=0.5$ ms in each subframe 641. The radio frame 637 includes twenty slots 639 (i.e., slots 0-19).

FIG. 7 illustrates examples of UL S-TTI association with one or more DL S-TTI. In example (a), a single DL S-TTI is associated with a slot based UL S-TTI. Example (a) has a legacy PDCCH region 743a. An S-TTI with 4 OFDM symbols 745 is associated with a slot size S-TTI UL 749a. A slot size S-TTI with 7 OFDM symbols 747 is associated with another slot size S-TTI UL 749b.

In example (b), multiple DL S-TTIs are associated with a slot based UL S-TTI. Example (b) has a legacy PDCCH region 743b and a shared DMRS for S-TTIs 755. A first S-TTI with 2 OFDM symbols 751a and a second S-TTI with 2 OFDM symbols 751b are associated with a first slot size S-TTI UL 749c. Two S-TTI with 3 or 4 OFDM symbols 753a-b are associated with a second slot size S-TTI UL 749d.

FIG. 8 illustrates slot based association slots for S-TTI. A legacy TTI 857 (i.e., subframe-long TTI) includes a downlink (D) subframe, a special (S) subframe and an uplink (U) subframe.

The S-TTI at slot level 859 (i.e., slot-long S-TTI) may include DL slots 861. A DL slot 861 may include one or more S-TTIs in each DL slot 861. The S-TTI at slot level also includes a special DL slot (SD), also known as downlink special (DS) slot 863, with DwPTS only, a special S-TTI slot or special special (SS) slot 865 that may include a DwPTS, a GP and a UpPTS, and UL slots 867 with S-TTI.

The DL subframe and UL subframe are applicable to both TDD and FDD frame structures. The special subframe is only applicable to TDD structure, including licensed assistant access (LAA).

A legacy 1 ms TTI DL subframe may be divided into 2 slots. The feedback of PDSCH transmissions ending in the slot is reported based on the association timing of the given slot. A DL slot 861 may include multiple DL S-TTIs with the same or different S-TTI sizes in a slot.

A legacy 1 ms TTI UL may also be divided into 2 slots 867, each slot 867 corresponding to a UL S-TTI.

A legacy special subframe in TDD networks with frame structure type 2 may be divided into two slots. The first slot is a special downlink (SD) (or downlink special (DS) 863) that contains only DL DwPTS, the length of the DwPTS depends on the special subframe configuration, a special DL slot may have one or more DL S-TTIs. The second slot is a special S-TTI slot or special special (SS) slot 865 with a DwPTS, a gap period and an UpPTS. The length of the DwPTS depends on the special subframe configuration, and may have a zero length.

FIG. 9 is a diagram illustrating an example of a TDD DL association set by reusing existing timing at slot level. There are seven different TDD UL/DL configurations, all with different association timings. In particular, FIG. 9 illustrates UL/DL configuration two (e.g., "UL/DL configuration 2") 969 with slot n and slot numbers 939.

Further illustrated in FIG. 9 are PDSCH HARQ-ACK associations 971 (e.g., PDSCH HARQ-ACK feedback on PUCCH or PUSCH associations). The PDSCH HARQ-ACK associations 971 may indicate HARQ-ACK reporting slots corresponding to slots for PDSCH transmissions (e.g., slots in which PDSCH transmissions may be sent and/or received).

Figure 10A:
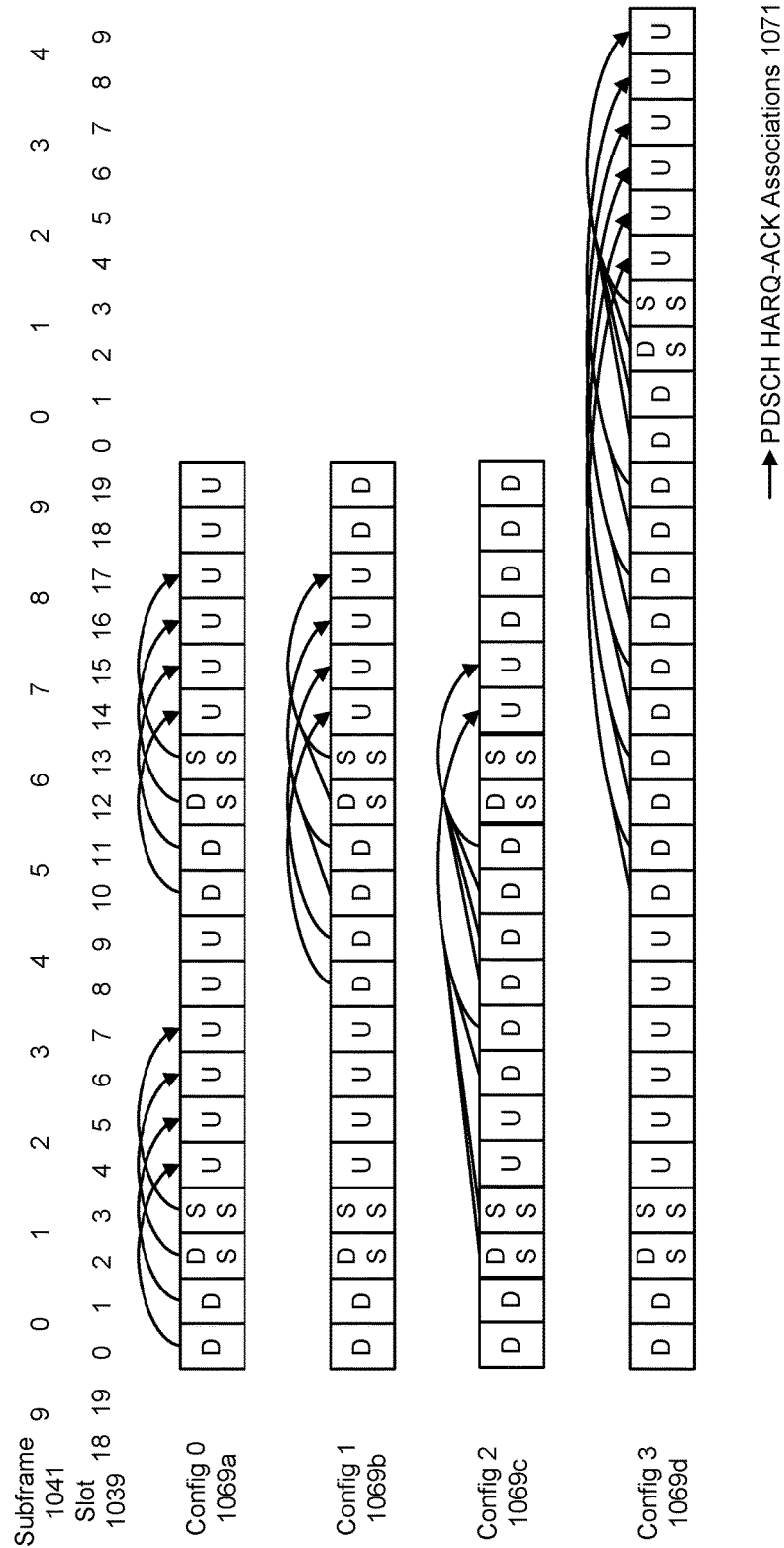
FIGS. 10A and 10B illustrate DL association sets with slot based S-TTI optimized for each TDD UL/DL configuration.
Figure 10B:
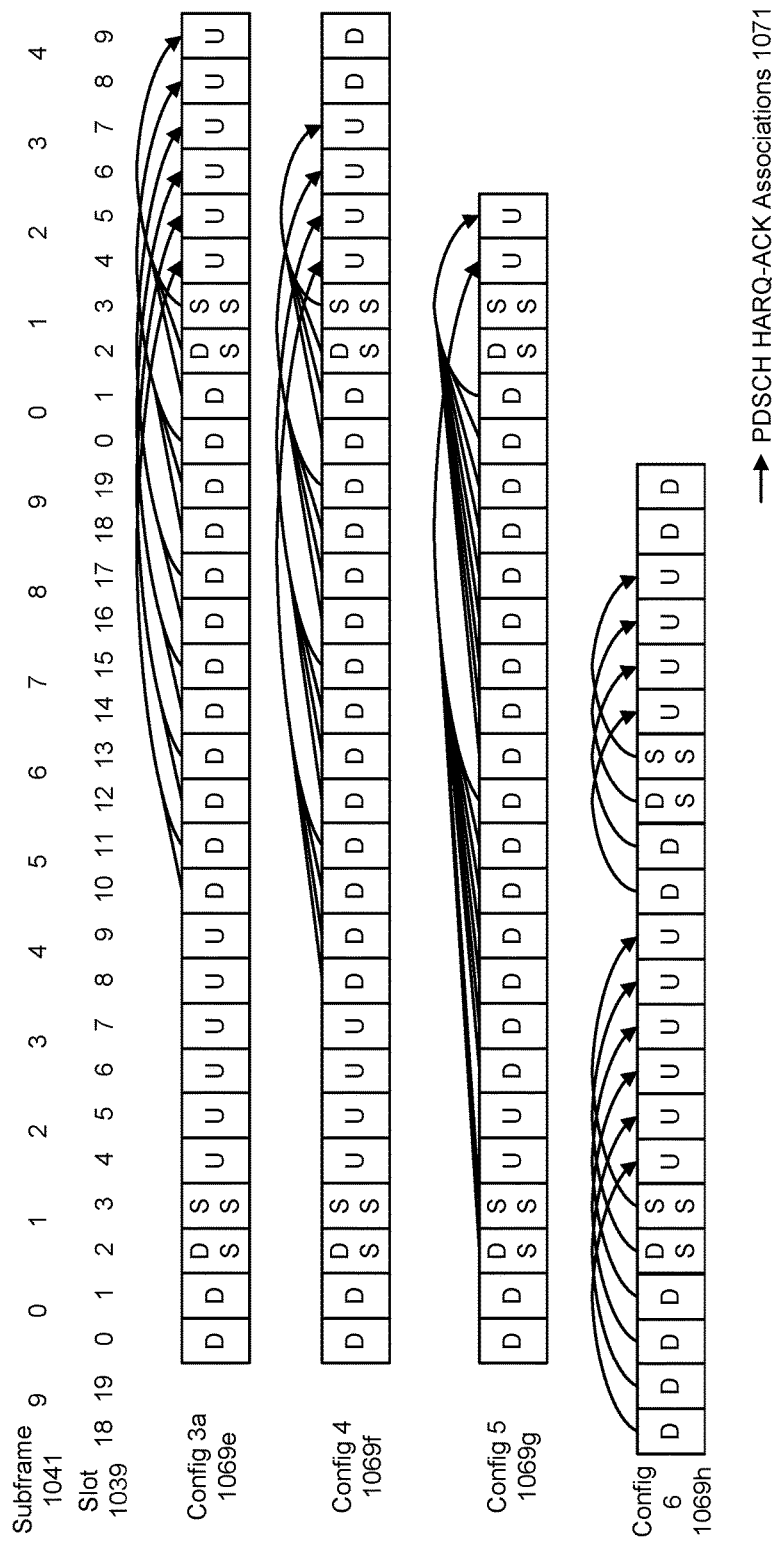

FIGS. 10A and 10B illustrate DL association sets with slot based S-TTI optimized for each TDD UL/DL configuration. The slot number 1039 and corresponding subframe numbers 1041 are depicted. FIGS. 10A and 10B correspond to the DL association set of Tables 5A and 5B. Further illustrated in FIGS. 10A and 10B are PDSCH HARQ-ACK associations 1071 (e.g., PDSCH HARQ-ACK feedback on PUCCH or PUSCH associations).

In particular, FIG. 10A illustrates UL/DL configuration zero 1069a (e.g., "Config 0"), UL/DL configuration one 1069b (e.g., "Config 1"), UL/DL configuration two 1069c (e.g., "Config 2") and UL/DL configuration three 1069d (e.g., "Config 3"). FIG. 10B illustrates UL/DL configuration four 1069f (e.g., "Config 4"), UL/DL configuration five 1069g (e.g., "Config 5") and UL/DL configuration six 1069h (e.g., "Config 6"). FIG. 10B also illustrates an alternative UL/DL configuration three 1069e (e.g., "Config 3a").

FIGS. 11A and 11B illustrate FDD DL association sets based on TDD UL/DL configurations. In particular, FIGS. 11A and 11B illustrate FDD DL association sets with FDD-TDD CA when the PCell or pSCell is a TDD cell. The slot number 1139 and corresponding subframe numbers 1141 are depicted for FDD slots 1173. Further illustrated in FIGS. 11A and 11B are PDSCH HARQ-ACK associations 1171 (e.g., PDSCH HARQ-ACK feedback on PUCCH or PUSCH associations). FIGS. 11A and 11B correspond to the DL association set of Tables 6A and 6B.

In particular, FIG. 11A illustrates UL/DL configuration zero 1169a (e.g., "Config 0"), UL/DL configuration one 1169b (e.g., "Config 1"), UL/DL configuration two 1169c (e.g., "Config 2") and UL/DL configuration three 1169d (e.g., "Config 3"). FIG. 11B illustrates UL/DL configuration four 1169f (e.g., "Config 4"), UL/DL configuration five 1169g (e.g., "Config 5") and UL/DL configuration six 1169h (e.g., "Config 6"). FIG. 11B also illustrates an alternative UL/DL configuration three 1169e (e.g., "Config 3a").

The FDD DL association set is extended from the TDD DL association set with newly added associations indicated in the dashed lines in FIGS. 11A and 11B. Each box in FIGS. 11A and 11B shows a subframe set associated with a slot based S-TTI UL.

Figure 12A:
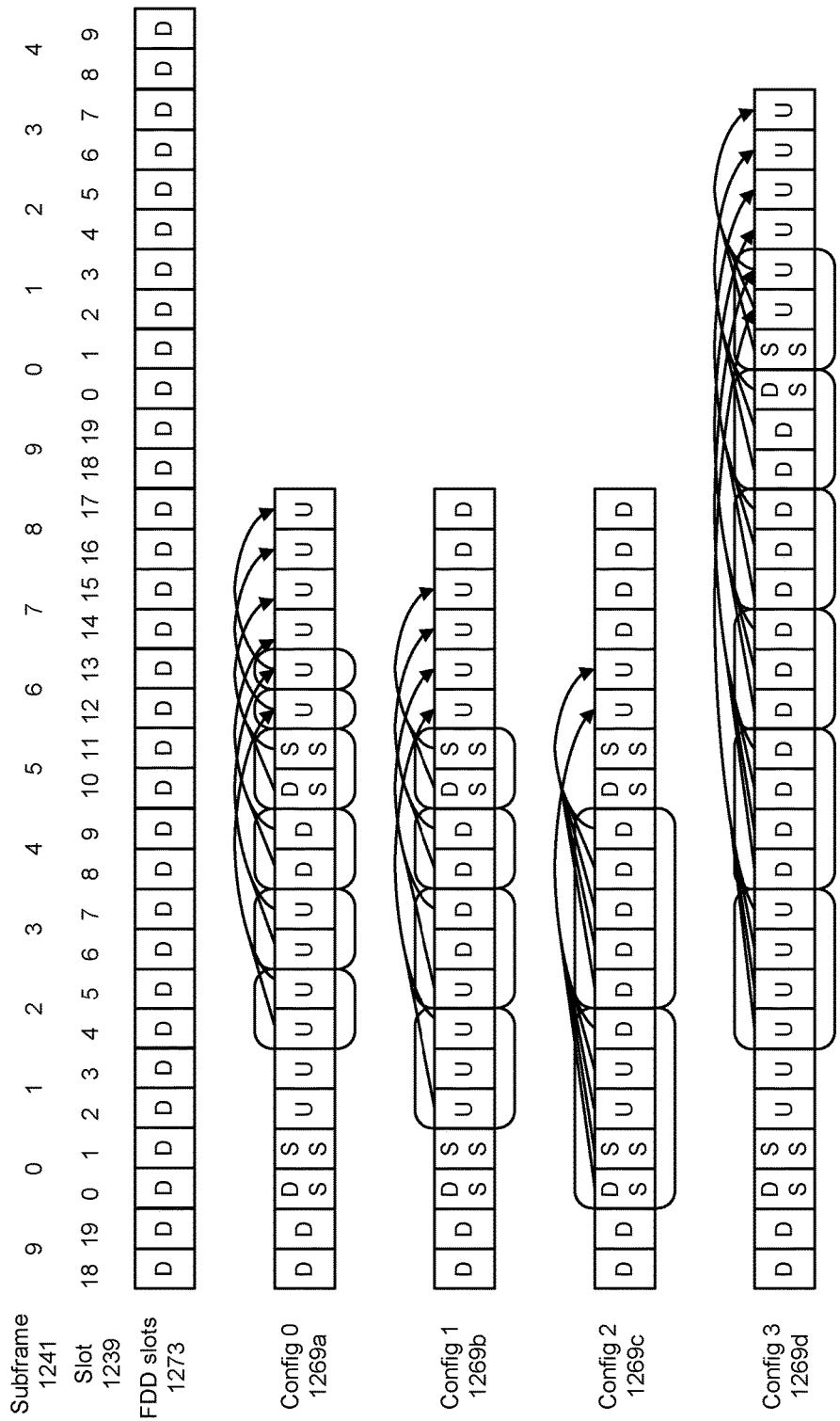
FIGS. 12A and 12B illustrate DL association sets optimized for FDD.
Figure 12B:
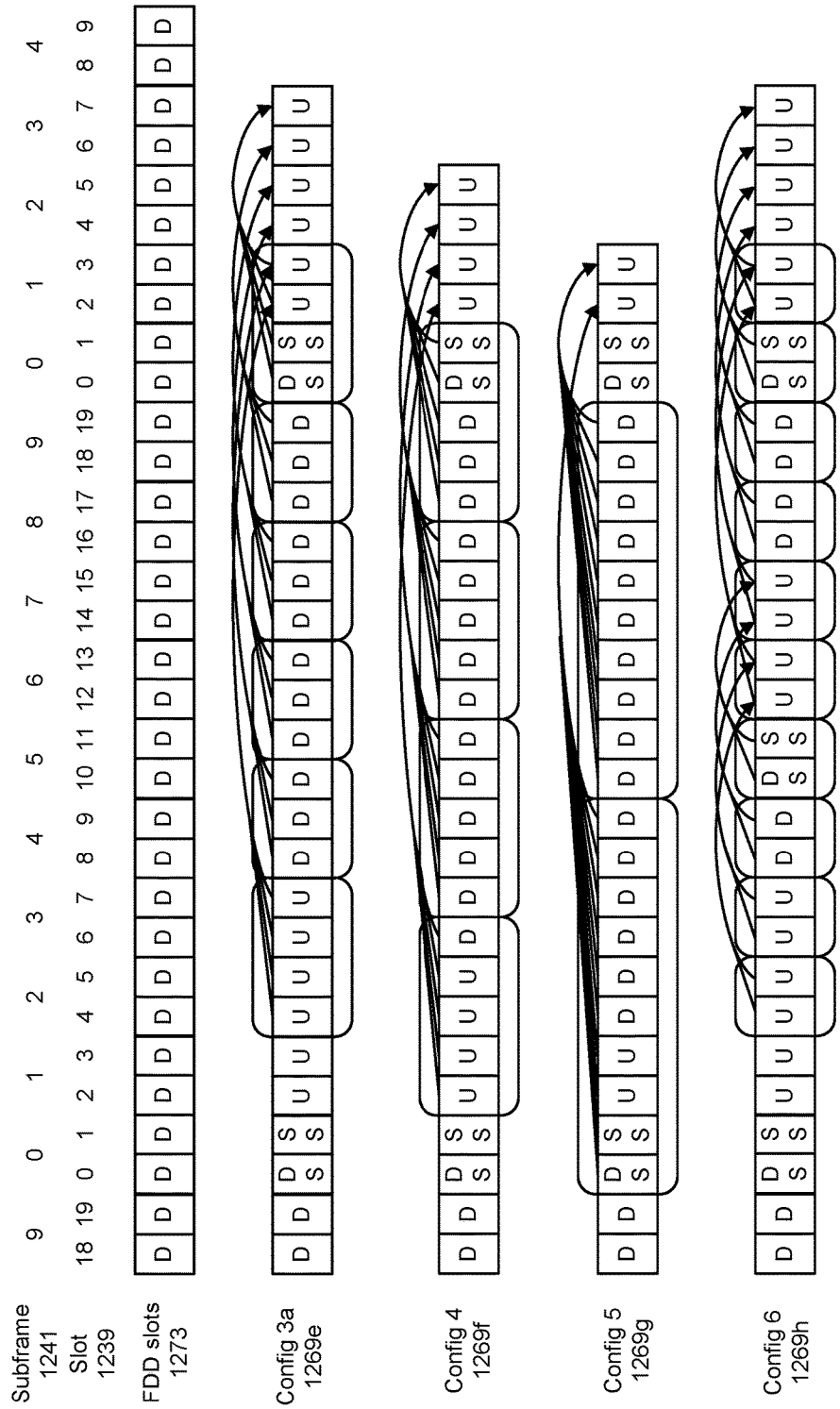

FIGS. 12A and 12B illustrate DL association sets optimized for FDD. The FDD DL association timing may be optimized for FDD based on the PCell or pSCell UL/DL configuration. The slot number 1239 and corresponding subframe numbers 1241 are depicted for FDD slots 1273. Further illustrated in FIGS. 12A and 12B are PDSCH HARQ-ACK associations 1271 (e.g., PDSCH HARQ-ACK feedback on PUCCH or PUSCH associations). FIGS. 12A and 12B correspond to the DL association set of Tables 7A and 7B.

In particular, FIG. 12A illustrates UL/DL configuration zero 1269a (e.g., "Config 0"), UL/DL configuration one 1269b (e.g., "Config 1"), UL/DL configuration two 1269c (e.g., "Config 2") and UL/DL configuration three 1269d (e.g., "Config 3"). FIG. 12B illustrates UL/DL configuration four 1269f (e.g., "Config 4"), UL/DL configuration five 1269g (e.g., "Config 5") and UL/DL configuration six 1269h (e.g., "Config 6"). FIG. 12B also illustrates an alternative UL/DL configuration three 1269e (e.g., "Config 3a").

The FDD DL association set is extended from the TDD DL association set with newly added associations indicated in the dashed lines in FIGS. 12A and 12B. Each box in FIGS. 12A and 12B shows a subframe set associated with a slot based S-TTI UL.

Figure 13:
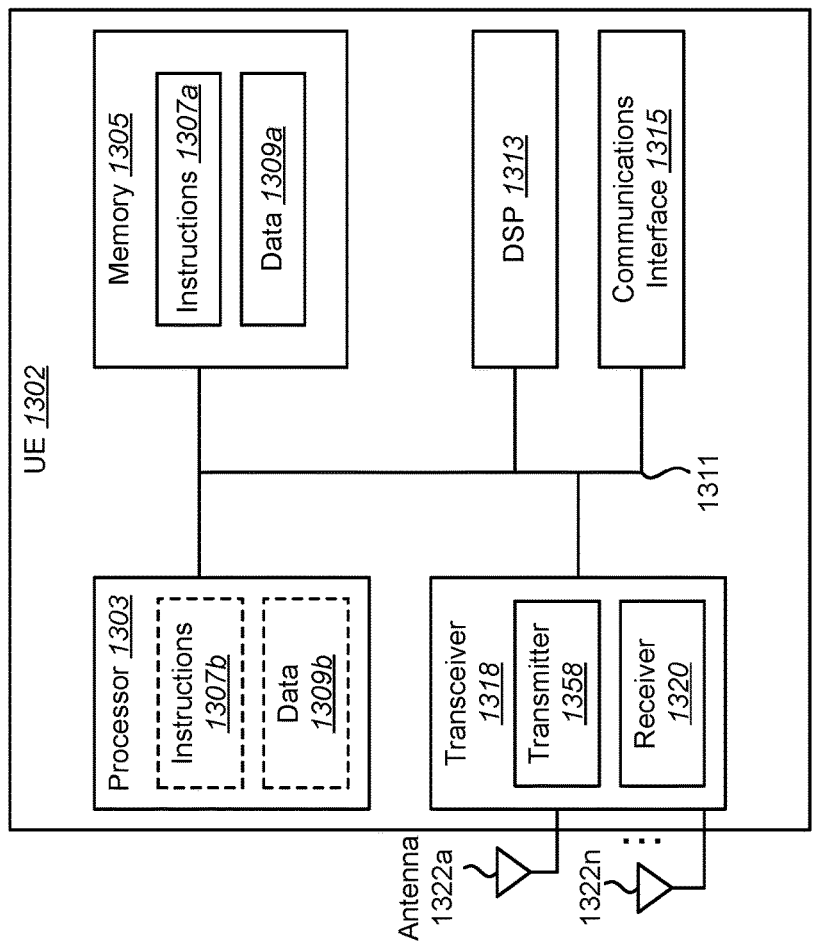
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement one or more of the method 200 and 300 described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
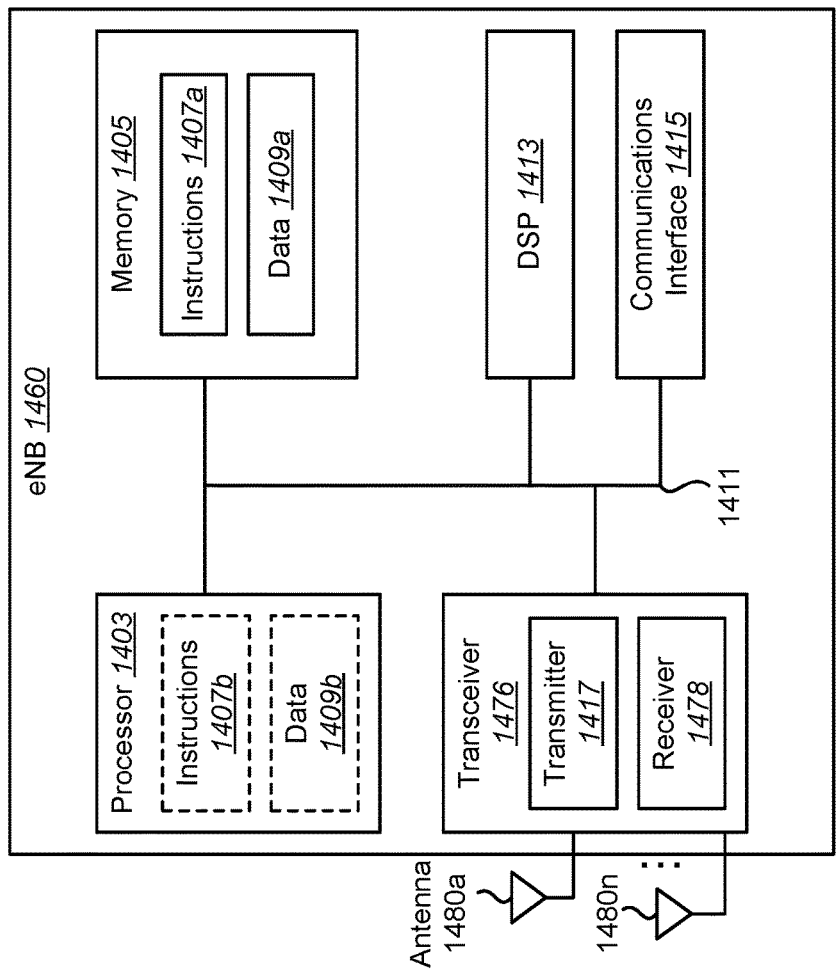
FIG. 14 illustrates various components that may be utilized in an eNB.

FIG. 14 illustrates various components that may be utilized in an eNB 1460. The eNB 1460 described in connection with FIG. 14 may be implemented in accordance with the eNB 160 described in connection with FIG. 1. The eNB 1460 includes a processor 1403 that controls operation of the eNB 1460. The processor 1403 may also be referred to as a central processing unit (CPU). Memory 1405, which may include read-only memory (ROM), random access memory (RAM), a combination of the two or any type of device that may store information, provides instructions 1407a and data 1493a to the processor 1403. A portion of the memory 1405 may also include non-volatile random access memory (NVRAM). Instructions 1407b and data 1493b may also reside in the processor 1403. Instructions 1407b and/or data 1493b loaded into the processor 1403 may also include instructions 1407a and/or data 1493a from memory 1405 that were loaded for execution or processing by the processor 1403. The instructions 1407b may be executed by the processor 1403 to implement one or more of the method 400 described above.

The eNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the eNB 1460 are coupled together by a bus system 1411, which may include a power bus, a control signal bus and a status signal bus, in addition to a data bus. However, for the sake of clarity, the various buses are illustrated in FIG. 14 as the bus system 1411. The eNB 1460 may also include a digital signal processor (DSP) 1413 for use in processing signals. The eNB 1460 may also include a communications interface 1415 that provides user access to the functions of the eNB 1460. The eNB 1460 illustrated in FIG. 14 is a functional block diagram rather than a listing of specific components.

Figure 15:
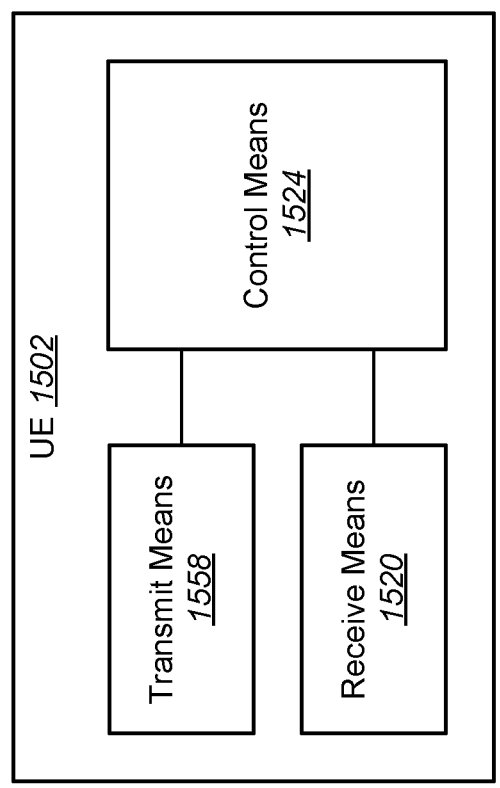
FIG. 15 is a block diagram illustrating one implementation of a UE in which systems and methods for association timing may be implemented.

FIG. 15 is a block diagram illustrating one implementation of a UE 1502 in which systems and methods for association timing may be implemented. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
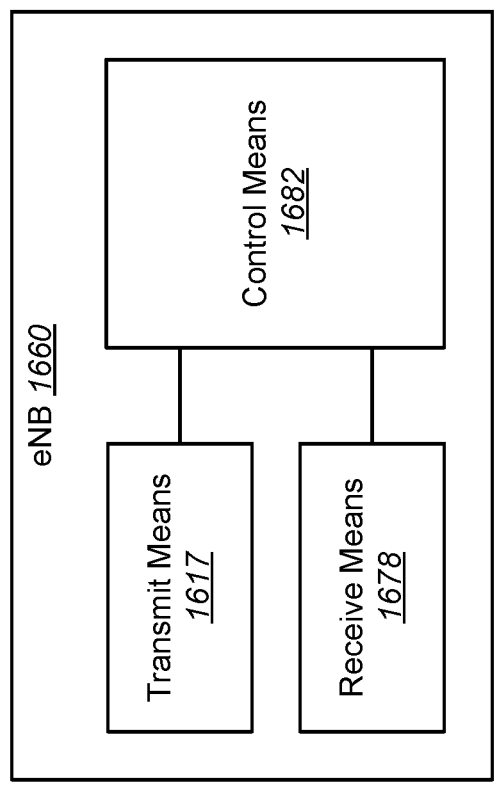
FIG. 16 is a block diagram illustrating one implementation of an eNB in which systems and methods association timing may be implemented.

FIG. 16 is a block diagram illustrating one implementation of an eNB 1660 in which systems and methods for association timing may be implemented. The eNB 1660 includes transmit means 1617, receive means 1678 and control means 1682. The transmit means 1617, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
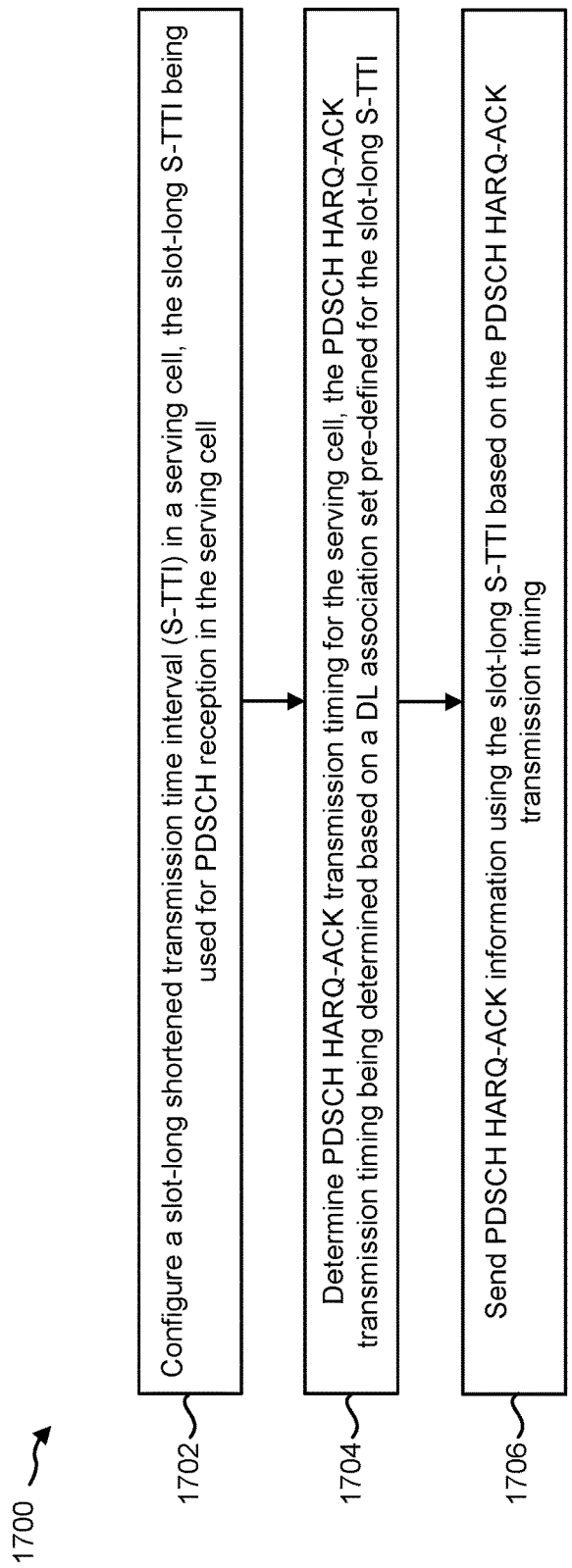
FIG. 17 is a flow diagram illustrating a method for association timing by a UE.

FIG. 17 is a flow diagram illustrating a method 1700 for association timing by a UE 102. The UE 102 may communicate with one or more eNBs 160 in a wireless communication network. In one implementation, the wireless communication network may include an LTE network.

The UE 102 may configure 1702 a slot-long shortened transmission time interval (S-TTI) in a serving cell. The slot-long S-TTI may be used for physical downlink shared channel (PDSCH) reception in the serving cell.

The UE 102 may determine 1704 PDSCH Hybrid Automatic Repeat Request Acknowledgement/Negative Acknowledgement (HARQ-ACK) transmission timing for the serving cell. The PDSCH HARQ-ACK transmission timing may be determined based on a downlink (DL) association set pre-defined for the slot-long S-TTI. The DL association set may maintain a timing of a DL association set for a subframe-long TTI.

The UE 102 may send 1706 PDSCH HARQ-ACK information using the slot-long S-TTI based on the PDSCH HARQ-ACK transmission timing. This may be done as described above.

If the serving cell is a time division duplex (TDD) cell, the DL association set may be a DL association set pre-defined for an UL/DL configuration which is equal to a DL-reference UL/DL configuration the serving cell. The DL-reference UL/DL configuration of the serving cell may be determined based on a DL-reference configuration of a primary cell and a UL/DL configuration of the serving cell.

If the serving cell is a frequency division duplex (FDD) cell, the DL association set may be a DL association set pre-defined for a UL/DL configuration which is equal to a DL-reference UL/DL configuration of a primary cell.

Figure 18:
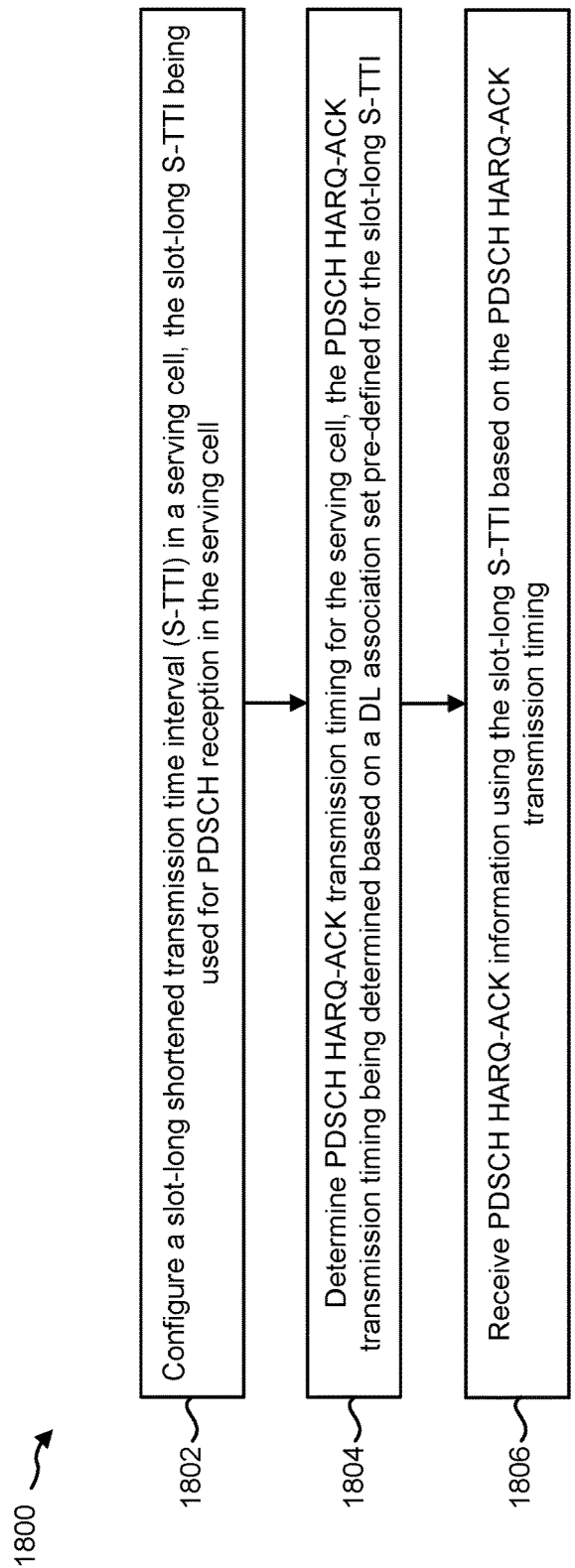
FIG. 18 is a flow diagram illustrating a method for association timing by an eNB.

FIG. 18 is a flow diagram illustrating a method 1800 for association timing by an eNB 160. The eNB 160 may communicate with one or more UEs 102 in a wireless communication network. In one implementation, the wireless communication network may include an LTE network.

The eNB 160 may configure 1802 a slot-long S-TTI in a serving cell. The slot-long S-TTI may be used for PDSCH reception in the serving cell.

The eNB 160 may determine 1804 PDSCH HARQ-ACK transmission timing for the serving cell. The PDSCH HARQ-ACK transmission timing may be determined based on a downlink (DL) association set pre-defined for the slot-long S-TTI. The DL association set may maintain a timing of a DL association set for a subframe-long TTI.

The eNB 160 may receive 1806 PDSCH HARQ-ACK information using the slot-long S-TTI based on the PDSCH HARQ-ACK transmission timing. This may be done as described above.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE) comprising:
receiving circuitry configured to receive a physical downlink shared channel (PDSCH); and
transmitting circuitry configured to transmit a Hybrid Automatic Repeat Request Acknowledgement/Negative Acknowledgement (HARQ-ACK) response for the PDSCH, wherein
in a case that a short transmission time interval (TTI) is not configured, the HARQ-ACK response is based on a first downlink (DL) association set, the first DL association set specifying downlink subframe(s) associated with each of subframe 0 to subframe 9, and in a case that the short TTI is configured, the HARQ-ACK response is based on a second DL association set, the second DL association set specifying downlink slot(s) associated with each of slot 0 to slot 19.

2. The UE of claim 1, wherein the first DL association set specifying that no downlink subframe is associated with one or more subframes among the subframe 0 to the subframe 9, and the second DL association set specifying that no downlink slot is associated with one or more slots among the slot 0 to the slot 19.

3. An evolved node B (eNB) comprising:

transmitting circuitry configured to transmit a physical downlink shared channel (PDSCH); and receiving circuitry configured to receive a Hybrid Automatic Repeat Request Acknowledgement/Negative Acknowledgement (HARQ-ACK) response for the PDSCH, wherein in a case that a short transmission time interval (TTI) is not configured, the HARQ-ACK response is based on a first downlink (DL) association set table, the first DL association set specifying downlink subframe(s) associated with each subframe 0 to subframe 9, and in a case that the short TTI is configured, the HARQ-ACK response is based on a second DL association set table, the second DL association set specifying downlink slot(s) associated with each slot 0 to slot 19.

4. The eNB of claim 3, wherein the first DL association set specifying that no downlink subframe is associated with one or more subframes among the subframe 0 to the subframe 9, and the second DL association set specifying that no downlink slot is associated with one or more slots among the slot 0 to the slot 19.

* * * * *

UNITED STATES PATENT AND TRADEMARK OFFICE
CERTIFICATE OF CORRECTION

PATENT NO.         : 10,165,564 B2
APPLICATION NO.    : 15/417080
DATED              : December 25, 2018
INVENTOR(S)        : Zhanping Yin et al.

Page 1 of 1

It is certified that error appears in the above-identified patent and that said Letters Patent is hereby corrected as shown below:

In the Claims

In Column 32, Line 3, Claim 3, delete "association set table" and replace it with -- association set --.

In Column 32, Line 8, Claim 3, delete "association set table" and replace it with -- association set --.

Signed and Sealed this
Thirtieth Day of July, 2019

Andrei Iancu
*Director of the United States Patent and Trademark Office*